COMMUNICATIONS CONTROL APPARATUS FOR SEQUENCING DIGITAL DATA AND ANALOG DATA FROM REMOTE STATIONS TO A CENTRAL DATA PROCESSOR

Filed Sept. 1, 1967 13 Sheets-Sheet 1

INVENTOR.
WALLACE N. PATTERSON
BY
Ronald M. O'Keefe
ATTORNEY

Nov. 17, 1970 W. N. PATERSON 3,541,513

COMMUNICATIONS CONTROL APPARATUS FOR SEQUENCING DIGITAL DATA AND ANALOG DATA FROM REMOTE STATIONS TO A CENTRAL DATA PROCESSOR

Filed Sept. 1, 1967 13 Sheets-Sheet 2

SCANNER CONTROLLER

WORD FORMAT-RECEPTION SEQUENCE

WORD FORMAT-TRANSMISSION SEQUENCE

COMMUNICATIONS CONTROL APPARATUS FOR SEQUENCING DIGITAL DATA AND ANALOG DATA FROM REMOTE STATIONS TO A CENTRAL DATA PROCESSOR

Filed Sept. 1, 1967

13 Sheets-Sheet 5

RECEIVE CONTROL

TRANSMIT CONTROL

R-REGISTER

Nov. 17, 1970

W. N. PATERSON 3,541,513

COMMUNICATIONS CONTROL APPARATUS FOR SEQUENCING DIGITAL DATA AND ANALOG DATA FROM REMOTE STATIONS TO A CENTRAL DATA PROCESSOR

Filed Sept. 1, 1967

13 Sheets-Sheet 9

ANALOG INPUT CONTROLLER

DIGITAL INPUT CONTROLLER

FLOW DIAGRAM - SCANNER CONTROLLER

TIMING DIAGRAM-SCANNER CONTROLLER

United States Patent Office 3,541,513
Patented Nov. 17, 1970

3,541,513

COMMUNICATIONS CONTROL APPARATUS FOR SEQUENCING DIGITAL DATA AND ANALOG DATA FROM REMOTE STATIONS TO A CENTRAL DATA PROCESSOR

Wallace N. Patterson, Phoenix, Ariz., assignor to General Electric Company, a corporation of New York Filed Sept. 1, 1967, Ser. No. 665,140
Int. Cl. G06f 3/05, 7/00
U.S. Cl. 340—151 9 Claims

ABSTRACT OF THE DISCLOSURE

Communications control apparatus in a computer system for transmitting information between a plurality of input/output modules and a central processor. In response to an instruction word comprising data and/or control information transmitted from the central processor to the communications control apparatus, the control apparatus transmits data to the appropriate input/ouptut module, if an output operation, or, if an input operation, transmits control information to the appropriate input/output module to initiate transfer of information from the module to the central processor. In response to an instruction requesting information from the analog input control module, the communications control apparatus transmits information from the digital input control module to the central processor while the desired analog information is being selected and converted to digital form and subsequently transmits the converted analog information to the central processor.

BACKGROUND OF THE INVENTION

Field of the invention

This invention relates to computer systems for processing information and, more particularly, to control apparatus for controlling the transfer of information between the central processor of a computer system and information generating and receiving elements or input/output modules forming a part of the computer system. Specifically, the invention relates to control apparatus for controlling the transfer of information from selected input/output modules to the central processor of the computer system.

Description of the prior art

In computer systems for controlling and/or monitoring processes, it is convenient to represent information and data in digital form. Certain information relating to the controlled and/or monitored process, for example the condition of valves, switches, etc., is already in digital form. Other information relating to the processes is normally available to the computer system in the form of a continuously variable electrical signal having a magnitude which is a function of the information represented. In order to conveniently utilize the information represented by the analog signal, the analog information must be converted to digital form in an analog-to-digital converter.

The parameters of the process already available in digital form are normally provided as inputs to a digital input controller, the digital input controller having an addressing and selecting arrangement so that the digital representation of any selected process parameter or group of process parameters in digital form may be made available to the central processor. Similarly, process parameters represented by analog signals are provided as inputs to an analog input controller, the analog input controller also containing an addressing arrangement for selecting a desired analog parameter. The selected analog parameter is normally applied to an analog-to-digital converter so that the representation of the process parameter is transmitted to the central processor in digital form.

The digital input controller normally comprises electronic components so that the addressing and selection of a desired process parameter can be rapidly accomplished and the parameter made available for transmission to the central processor. However, the analog input controller because of the low levels of the analog signals normally includes relays which introduce significant time delays in addressing and selecting a desired analog parameter for transmission to the central processor. In addition, time must be allotted to permit settling of the amplifiers in the analog input controller and for conversion of the analog information to digital form in the analog-to-digital converter. During the time required for addressing, amplification and conversion of the analog information, the communications apparatus for transmitting information to the central processor is not being used to its capacity. Accordingly, it is desirable to more efficiently utilize the information transmission capabilities of the communications apparatus provided to transmit information from analog and digital input controllers to the central processor of a computer system.

It is therefore an object of this invention to provide improved communications apparatus in a computer system.

It is another object of this invention to provide improved apparatus for automatically transmitting information from input/output modules to the central processor of a computer system.

It is a further object of this invention to provide a communications arrangement in a computer system for more efficiently utilizing the communications apparatus provided to transmit information from analog and digital input controllers to a central processor.

SUMMARY OF THE INVENTION

The foregoing objects are achieved, in accordance with the illustrated embodiment of the invention, by providing a scanner controller for controlling communications between a central processor and a plurality of input/output modules. The plurality of input/output modules include a digital input controller for making selected digital parameters of a process available for use in the computer system. An analog input controller is also provided along with an analog-to-digital converter for making analog parameters of the process available in digital form for use in the computer system. Communications with a selected input/output module is initiated by the central processor through transmission to the scanner controller of an instruction word comprising data and control information for transmission to an input/output module or control information directing a selected input/output module to transfer information to the central processor. In response to transmission of an instruction word to the scanner controller requesting the transfer of information from the analog input controller to the central processor, the scanner controller transmits control information to both the digital input controller and the analog input controller and generates gating signal CDIR to immediately transfer information from the digital input controller to the central processor through the scanner controller. A flip-flop CNV is set to the 1-state to remember that information from the analog input controller must also be transferred to the central processor. Upon completion of transfer of the information from the digital input controller to the central processor through the scanner controller and when the requested information from the analog input controller is available at the output of the analog-to-digital converter, gating signal CAIR is generated by the scanner controller to transfer the information from the analog-to-digital converter to the central processor through the scanner controller.

BRIEF DESCRIPTION OF THE DRAWINGS

The subject matter of the invention is particularly pointed out and distinctly claimed in the concluding portion of the specification. The invention, however, both as to organization and method of operation may best be understood by reference to the following description taken in connection with the accompanying drawings, in which:

DESCRIPTION OF THE PREFERRED EMBODIMENT

Computer system—General

Figure 1:
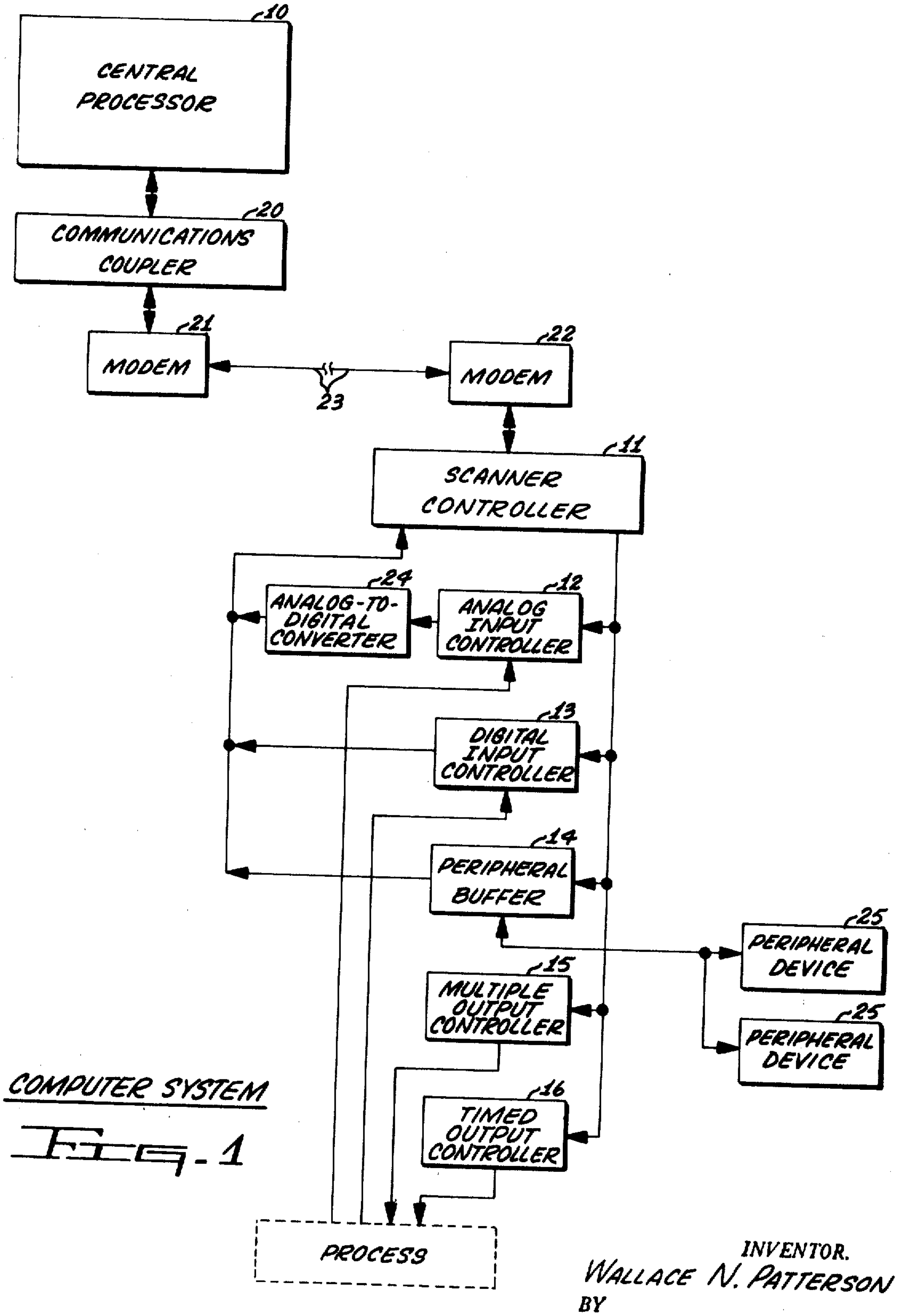
FIG. 1 is a block diagram of a system to which the instant invention is applicable.

FIG. 1 illustrates diagrammatically a typical computer system organized to control and/or monitor a process, the operation of a plant, or other function. The major units of the computer control system are Central Processor 10, Scanner Controller 11 and various input/output modules, viz Analog Input Controller 12, Digital Input Controller 13, Peripheral Buffer 14, Multiple Output Controller 15 and Timed Output Controller 16. Transfer of information between Central Processor 10 and Scanner Controller 11 is provided through Communications Coupler 20 and communications modulator/demodulator units, called Modems, 21 and 22. Communications Coupler 20 is connected between Central Processor 10 and Modem 21 while Modem 22 is connected directly to Scanner Controller 11, as illustrated in FIG. 1. Modems 21 and 22 may be separated by a distance and are interconnected through telephone line 23. Scanner Controller 11 may therefore be remotely positioned relative to Central Processor 10.

Analog Input Controller 12 and Digital Input Controller 13 receive analog and digital input signals respectively representing process parameters from process sensing devices and make selected process parameter signals available to Scanner Controller 11 for transmission to Central Processor 10. The process sensor output signals received by Analog Input Controller 12 represent continuously variable parameters, for example temperature, pressure, flow rate, etc. The output of Analog Input Controller 12 is an analog signal representing a selected process parameter and is applied to Analog-to-Digital Converter 24 to convert the analog signal to an equivalent digital signal prior to transmission to Scanner Controller 11. The process sensor output signals applied to Digital Input Controller 13 represent process parameters that can be represented in binary form, for example the status of valves or contacts as open or closed. The output of Digital Input Controller 13 representing selected process parameters is already in digital form and is applied directly to Scanner Controller 11. Analog Input Controller 12 and Digital Input Controller 13 both receive command information from Central Processor 10 transmitted through Scanner Controller 11.

Peripheral Buffer 14 may be connected to a plurality of peripheral devices 25. Peripheral devices 25 may include, for example, an input/output typer, a logging typer, an alarm typer, a tape or card punch, or a tape or card reader. Peripheral Buffer 14 receives commands from Central Processor 10 through Scanner Controller 11 requesting information from peripheral devices 12 and also receives commands and data from Central Processor 10 through Scanner Controller 11 for transmission to peripheral devices 25. Information transferred from peripheral devices 25 to Central Processor 10 in response to a command requesting data is transferred through Peripheral Buffer 14 and Scanner Controller 11. Multiple Output Controller 15 and Timed Output Controller 16 receive information from Central Processor 10 through Scanner Controller 11 for transmission to the process. Scanner Controller 11 thus serves as a channel for transmission of information, commands and data to the process and to peripheral devices. Scanner Controller 11 also serves as a channel for transmission of information from peripheral devices and information relating to the process to Central Processor 10. Transfer of information between Central Processor 10 and Communications Coupler 20 and between Scanner Controller 11 and each of the input/output modules is parallel by bit. Transmission of information between Communications Coupler 20 and Scanner Controller 11 through Modems 21 and 22 is serial by bit.

When a request for information is transmitted from Central Processor 10 to Analog Input Controller 12 through Scanner Controller 11, a period of time elapses before a digital signal representing the requested information is available at the output of Analog-to-Digital Converter 24 for transmission to Central Processor 10. The time delay between the request and the availability of the information is due to the time required for the relay selection process and for amplifier settling in Analog Input Controller 12 and also the time required for analog to digital conversion in converter 24. In accordance with the invention, efficiency of operation of the system is increased by utilizing Scanner Controller 11 to transmit information from a different input/output module to Central Processor 10 during the time delay in Analog Input Controller 12 and Analog-to-Digital Converter 24. Specifically, in accordance with the invention, Scanner Controller 11 is responsive to a request from Central Processor 10 for information from Analog Input Controller 12 for causing information to be transmitted to Central Processor 10 from Digital Input Controller 13 during the time delay in the analog input apparatus.

Scanner controller—General

Figure 2:
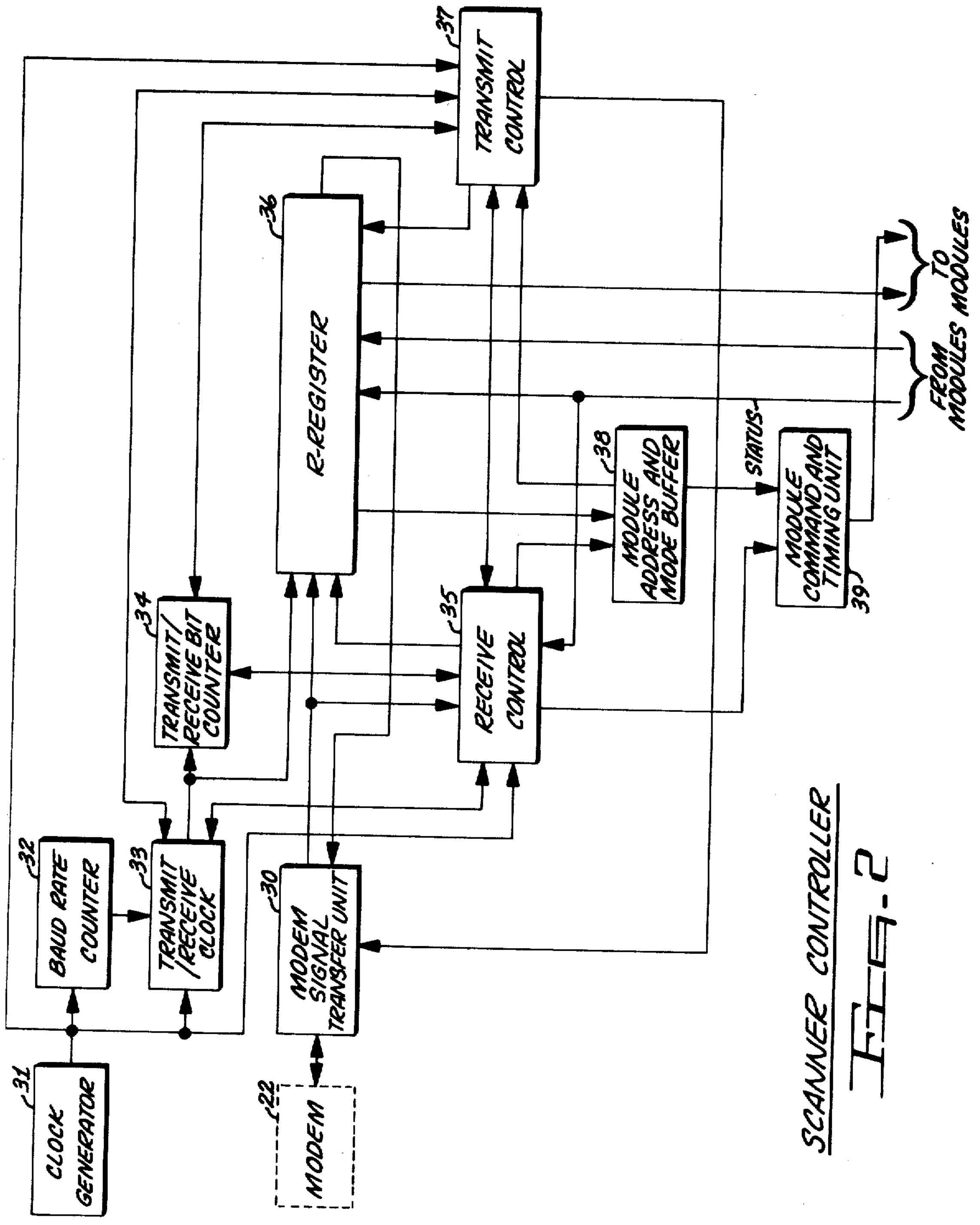
FIG. 2 is a block diagram illustrating the organization of the scanner controller of the invention as employed in the system of FIG. 1.

Referring to FIG. 2, Scanner Controller 11 comprises modem signal transfer unit 30, clock generator 31, baud rate counter 32, transmit/receive clock 33, transmit/receive bit counter 34, receive control 35. R-register 36, transmit control 37, module address and mode buffer 38 and module command and timing unit 39. Modem signal transfer unit 30 receives information in serial form from Modem 22 and transfers the received information serially by bit to R-register 36 under control of receive control 35. Receive control 35 is responsive to a start bit of the received information to permit R-register 36 to receive and store the information, the information being serially shifted into R-register 36. During transfer of information from an input/output module to Central Processor 10, the contents of R-register 36 are shifted and applied serially by bit to modem signal transfer unit 30 for transmission through Modem 22 under control of transmit control 37.

Clock generator 31 provides a basic clock signal at an appropriate frequency, for example 720 kilocycles per second, to control the timing of operation in Scanner Controller 11. Baud rate counter 32 receives the clock signal provided by clock generator 31 and serves as a frequency divider to provide an output signal occurring at a relatively low frequency, for example 1200 baud or bits per second compatible with the transmission rate of information between Modems 21 and 22 over line 23. Transmit/receive clock 33 receives the outputs of clock generator 31, baud rate counter 32, receives control 35 and transmit control 37 to provide a series of pulses at the baud rate frequency during serial reception of information from Modem 22 by R-register 36 and during serial transmission of information from R-register 36 to Modem 22 through modem signal transfer unit 30. The output of transmit/receive clock 33 serves to properly gate each received bit of information into R-register 36, to cause shifting of the contents of R-register 36 during reception or transmission of information and also permits transmit/receive bit counter 34 to count the received or transmitted bits. During transmission of information from Central Processor 10 to Scanner Controller 11, transmit/receive bit counter 34 notifies receive control 35 when a full word has shifted into R-register 36 and receive control 35 inhibits further operation of transmit/receive clock 33. During transmission of information from Scanner Controller 11 to Central Processor 10, transmit/receive bit counter 34 provides an output to transmit control 37 indicating that a full word has been transferred from R-register 36 through modem signal transfer unit 30 and transmit control 37 then inhibits further operation of transmit/receive clock 33.

During transmission of information from Central Processor 10 to an input/output module through Scanner Controller 11, module address and mode buffer 38 receives information stored in R-register 36 identifying the module to which the information is addressed and designating the mode of operation of that input/output module. The transfer of informtaion from R-register 36 to module address and mode buffer 38 is controlled by receive control 35. During the transfer of information from an input/output module to Central Processor 10 through Scanner Conroller 11, the contents of module address and mode buffer 38 identify to transmit control 37 the input/output module from which information is to be gated into R-register 36. Module command and timing unit 39 is responsive to the contents of module address and mode buffer 38 and to timing signals from receive control 35 and transmits to the appropriate input/output module control information for initiating operation of the module. Control information and/or data is also transferred from R-register 36 to the appropriate input/output module and, as illustrated in FIG. 2, R-register 36 receives information, including input/output module status information, directly from the input/output modules. Information transferred between R-register 36 and the input/output modules is in parallel by bit form.

WORD FORMATS

The operation of Scanner Controller 11 follows a predetermined pattern, viz a reception sequence followed by one or two transmission sequences. During a reception sequence, an instruction word is transmitted from Central Processor 10 to Scanner Controller 11, the instruction word identifying a selected input/output module, the mode of operation of that module if applicable, data to be transferred to the addressed module if an output operation, and address and control information for directing the operation of the addressed module. The received instruction word is stored in R-register 36 of Scanner Controller 11 and appropriate information contained in the instruction word is transferred to the addressed input/output module to initiate operation of the module. During a transmission sequence, information is transmitted from the modules to Central Processor 10 through Scanner Controller 11. The word transmitted to Central Processor 10 during the transmission sequence may include data from an input/output module, status information and various other information concerning the modules. Preparatory to a transmission sequence, this information is initially transferred from the modules to R-register 36 of Scanner Controller 11. Normally, a transmission sequence is terminated when one word of information is transmitted from Scanner Controller 11 to Central Processor 10. However, in accordance with the invention, if the addressed input/output module is Analog Input Controller 12, two words are transmitted from Scanner Controller 11 to Central Processor 10 during the transmission sequence, the first word containing data from Digital Input Controller 13 and the second word containing data from Analog Input Controller 12. Upon completion of a transmission sequence, Scanner Controller 11 is ready to enter another reception sequence.

Figure 3:
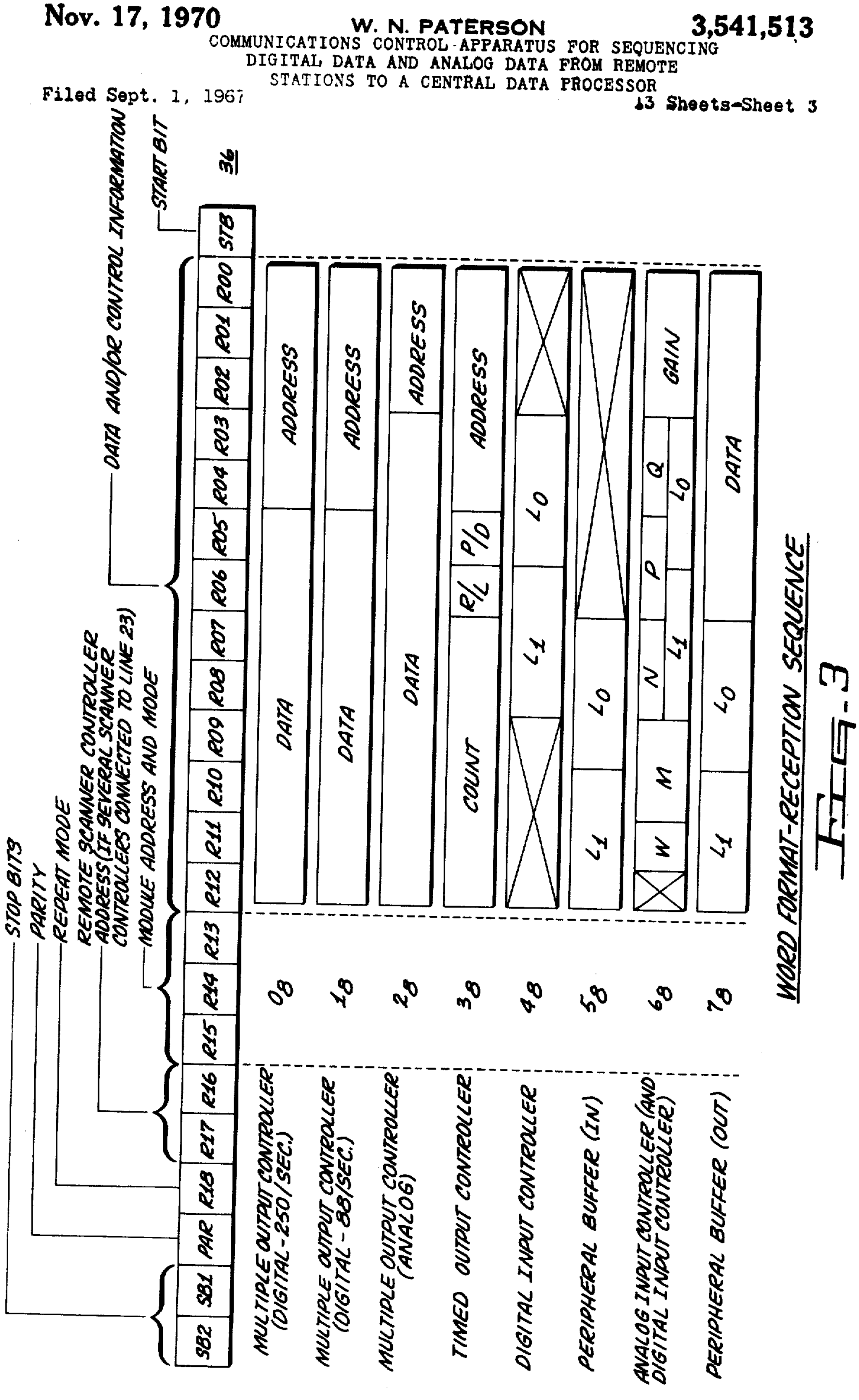
FIG. 3 is a symbolic diagram illustrating the organization of instruction words received by the scanner controller from the central processor for transmission to the input/output modules of the system of FIG. 1.

FIG. 3 illustrates the format of instruction words which may be received from Central Processor 10 and stored in R-register 36 of Scanner Controller 11. The binary digits or bits of the instruction word are received serially from Central Processor 10 through Modem 22 commencing with the start bit of the instruction word which is initially received in flip-flop SB2 of R-register 36 from modem signal transfer unit 30 and shifted through successive flip-flops of R-register 36 for storage in flip-flop STB. The start bit is indicated by a change from mark or binary 1 to space or binary 0 at the input to modem signal transfer unit 30. Each of the remaining successive bits of the instruction word is similarly initially stored in flip-flop SB2 and shifted through successive flip-flops until stored in the appropriate flip-flop of R-register 36.

As illustrated in FIG. 3, flip-flops R15, R14 and R13 of R-register 36 store module address and mode information. If the contents of flip-flops R15–R13 are 000, 001 or 010 (or $0_8$, $1_8$ or $2_8$ expressed in octal notation), the addressed input/output module is Multiple Output Controller 15. As indicated, Multiple Output Controller 15 may operate in three different modes, providing digital outputs to the process at two different transmission rates or providing analog information to the process. In the digital modes, flip-flops R12–R05 of R-register 36 store eight bits of digital data for transmission to Multiple Output Controller 15 while flip-flops R04–R00 store address information for transmission to Multiple Output Controller 15. In the analog mode, flip-flops R12–R03 store analog data while flip-flops R02–R00 store address information for transmission to Multiple Output Controller 15.

If the contents of flip-flops R15–R13 of R-register 36 are $3_8$, the addressed input/output module is Timed Output Controller 16. Flip-flops R12–R07 then contain time duration count information. Flip-flops R06 and R05 store control information while address information is stored in flip-flops R04–R00 for transmission to Timed Output Controller 16.

Digital Input Controller 13 is the addressed input/output module if the contents of flip-flops R15–R13 are $4_8$. In this event, flip-flops R08–R03 contain address information L1 and L0 for addressing one of 64 groups of digital input points for transmission of the corresponding digital signals to Central Processor 10 during the following transmission sequence. Flip-flops R12–R09 and R02–R00 are not employed when Digital Input Controller 13 is addressed.

Peripheral Buffer 14 is addressed when the contents of flip-flops R15–R13 of R-register 36 are either $5_8$ or $7_8$. Flip-flops R12–R07 contain address information L1 and L0 for addressing one of a plurality of peripheral devices. The input mode of Peripheral Buffer 14 requiring transmission of information from a peripheral device to Central Processor 10 is identified by $5_8$ while the output mode requiring transfer of information to a peripheral device is designated by the quantity $7_8$ in the module address and mode bits. In the latter instance, flip-flops R06–R00 contain data for transmission to the peripheral device identified by address information L1 and L0 in flip-flops R12–R07.

When the contents of flip-flops R15–R13 are $6_8$, Analog Input Controller 12 is the addressed input/output module. Flip-flops R11–R03 then contain address information W, M, N, P and Q for selecting one of 512 analog input points for transmission of the corresponding analog signal to Central Processor 10 during a subsequent transmission sequence. The contents of flip-flops R02–R00 control the gain of the amplifier which amplifies the analog signal prior to application to Analog-to-Digital Converter 24. In accordance with the invention, Digital Input Controller 13 also responds to module address $6_8$ and utilizes the contents of flip-flops R08–R03 to address a group of digital input points so that Scanner Controller 11 transfers the digital information from Digital Input Controller 13 to Central Processor 10 while Analog Input Controller 12 and Analog-to-Digital Converter 24 are responding to the instruction word.

Flip-flops R17 and R16 contain a scanner controller address which is employed when a plurality of scanner controllers are connected to Central Processor 10 through line 23. Flip-flop R18 is employed to control a checking mode of Scanner Controller 11 while flip-flop PAR stores parity information employed to check the validity of the received instruction word. Flip-flops SB2 and SB1 are not employed during a reception sequence except to shift the instruction word to its proper position in R-register 36.

Figure 4:
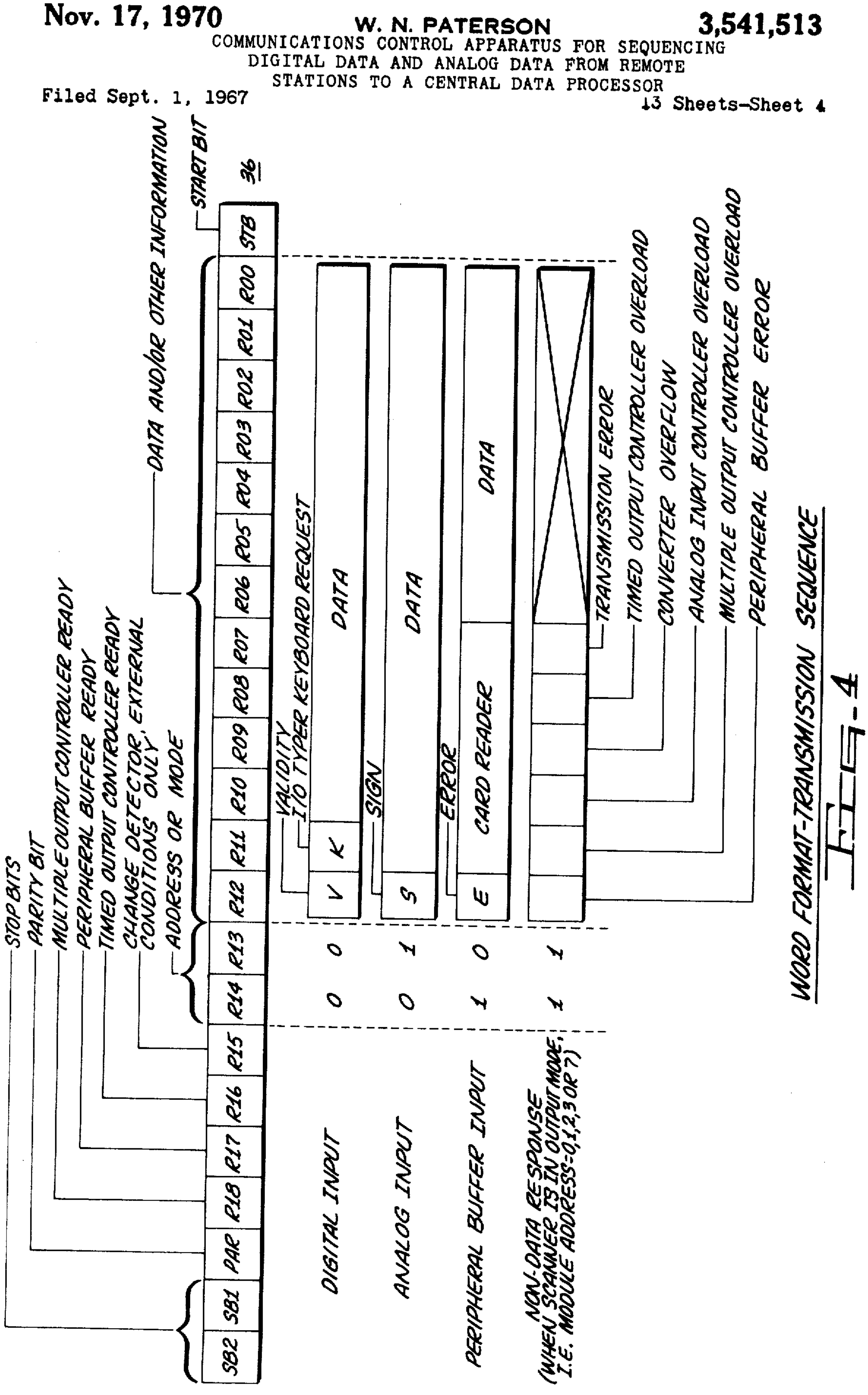
FIG. 4 is a symbolic diagram illustrating the organization of information words, including status information received by the scanner controller from the indicated input/output modules during transmission of information from the input/output modules to the central processor of the system of FIG. 1.

The format of the word transmitted from Scanner Controller 11 to Central Processor 10 during a transmission sequence is illustrated in FIG. 4. During the transmission sequence, the contents of R-register 36 are serially shifted through flip-flop STB to modem signal transfer unit 30 for transmission to Central Processor 10.

Flip-flops R14 and R13 of R-register 36 identify the input/output module from which data is being transmitted to Central Processor 10 or, if no data is to be transmitted to Central Processor 10 during the transmission sequence, identify the transmission of a non-data response to Central Processor 10. Transmission of information from Digital Input Controller 13 to Central Processor 10 is identified by binary digits 00 in flip-flops R14 and R13 respectively. Flip-flops R10–R00 then contain digital information from the process while flip-flops R12 and R11 contain control information from Digital Input Controller 13.

The transfer of information from Analog Input Controller 12 to Central Processor 10 is identified by binary digits 01 in flip-flops R14 and R13 respectively. Flip-flops R11–R00 then contain the digital representation of an analog signal from the process while flip-flop R12 indicates the sign of the analog signal. The binary digits 10 in flip-flops R14 and R13 respectively identify the input mode of Peripheral Buffer 14. In this event, flip-flops R06–R00 store data from a peripheral device while flip-flop R12 stores error information. If the peripheral device for which information is being transmitted is a card reader, flip-flops R11–R07 are also employed to store data.

If the instruction word transmitted from Central Processor 10 to Scanner Controller 11 during the previous reception sequence addressed Multiple Output Controller 15, Timed Output Controller 16, or initiated the output mode of Peripheral Buffer 14, the contents of flip-flops R12–R00 correspond to a non-data response, as illustrated in FIG. 4. Flip-flop R12 contains peripheral buffer error information, flip-flops R11, R10 and R08 contain overload information, flip-flop R09 contains overflow information and flip-flop R07 contains transmission error (e.g. parity) information. Flip-flops R06–R00 are not employed during a non-data response. Flip-flops R14 and R13 contain the binary digits 1, 1 respectively to identify a non-data response.

Flip-flops R18–R15 of R-register 36 contain status information which is transmitted to Central Processor 10 during each transmission sequence. Flip-flop PAR contains parity information for the transmitted word. Flip-flops SB2 and SB1 are set to the 1-state prior to the transmission of the contents of R-register 36 to Central Processor 10 to provide a time period between successive transmissions of information to Central Processor 10.

SCANNER CONTROLLER—DETAILS

Modem signal transfer unit

Figure 5:
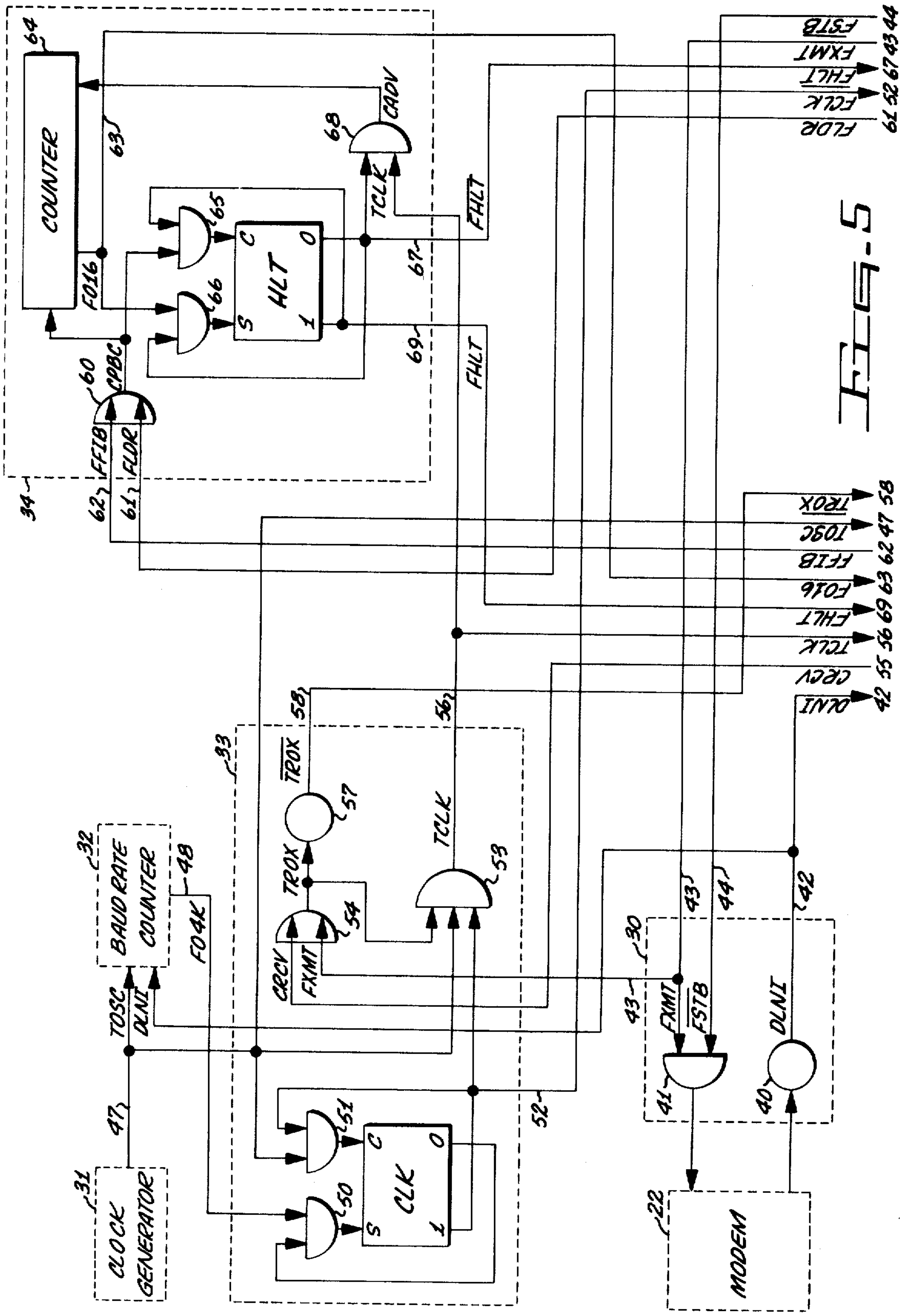
FIG. 5 is a logic diagram illustrating the logical structure of the modem signal transfer unit, clock generator, baud rate counter, transmit/receive clock and transmit/receive bit counter of the scanner controller of FIG. 2.

Referring to FIG. 5, modem signal transfer unit 30 comprises inverter 40 and AND-gate 41. Inverter 40 is employed during a reception sequence to receive in sequence the binary digits transmitted from Central Processor 10 through Modem 22 and inverts the electrical signals representing the binary digits so that the binary 1 or "mark" in Scanner Controller 11 is represented by a positive potential and a binary 0 or "space" is represented by a relatively negative potential. Output signal DLNI of inverter 40 on line 42 representing successive binary digits received through Modem 22 is applied to receive control 35 and R-register 36.

AND-gate 41 is employed during a transmission sequence to transfer binary digits in sequence from R-register 36 to Modem 22. Signal FXMT is applied to an input terminal of AND-gate 41 on line 43 from transmit control 37 to enable AND-gate 41 during the transmission sequence. Each of the binary digits transmitted in sequence from R-register 36 to Modem 12 is represented by the binary state of signal $\overline{FSTB}$ on line 44 which represents the inverse of the binary digit stored in flip-flop STB of R-register 36 as each binary digit of the word stored in R-register 36 is serially shifted through flip-flop STB. AND-gate 41 is thus enabled to transmit a binary 1 to Modem 22 during a transmission sequence when a binary 0 is stored in flip-flop STB. Similarly, signal $\overline{FSTB}$ is a binary 0 and AND-gate 41 is disabled during a transmission sequence when the binary digit stored in flip-flop STB is a binary 1. Thus, the binary digits transmitted in sequence through AND-gate 41 to Modem 22 during a transmission sequence represent the inverse of the binary digits stored in R-register 36.

Clock generator, baud rate counter and transmit/receive clock

FIG. 5 also illustrates clock generator 31, baud rate counter 32 and the logic details of transmit/receive clock 33. Clock generator 31 provides basic clock pulses TOSC at a rate of 720 kilocycles per second on line 47. Basic clock pulses TOSC are applied to baud rate counter 32 which serves as a frequency divider. Baud rate counter 32 is preset to an initial count when signal DLNI on line 42 from modem signal transfer unit 30 changes from mark to space, indicating reception of a start bit. Baud rate counter 32 provides signal F04K on line 48 to transmit/receive clock 33, signal F04K occurring at an appropriate rate, for example 1200 times per second. Output signal TOSC of clock generator 31 is also applied on line 47 to receive control 35 and transmit control 37.

AND-gate 50 connected to the set input terminal of flip-flop CLK receives signal F04K on line 48 from baud rate counter 32 in addition to output signal $\overline{FCLK}$ of flip-flop CLK. AND-gate 51 connected to the reset input terminal of flip-flop CLK receives basic clock signal TOSC in addition to output signal FCLK of flip-flop CLK. Flip-flop CLK is thus set to the 1-state at the rate of 1200 times per second in response to output signal F04K of baud rate counter 32 and is immediately reset to the 0-state in response to the next basic clock signal TOSC.

Output signal FCLK of flip-flop CLK on line 52 is applied to transmit control 37. Output signal FCLK of flip-flop CLK is also applied to AND-gate 53 along with basic clock signal TOSC and output signal TROX of OR-gate 54. OR-gate 54 receives signal FXMT from transmit control 37 on line 43 and signal CRCV from receive control 35 on line 55. Signal FXMT indicates that Scanner Controller 11 is transmitting information to Central Processor 10 while signal CRCV indicates that Scanner Controller 11 is receiving information from Central Processor 10. AND-gate 53 is thus enabled to provide output signal TCLK on line 56 during transmission of information from or reception of information in R-register 36, signal TCLK having the same wave form as signal TOSC but occurring at a rate of 1200 times per second during the time period defined by signal TROX. Signal TCLK on line 56 is applied to transmit/receive counter 34, receive control 35 and R-register 36. Output signal TROX of OR-gate 54 is applied to inverter 57 to provide signal $\overline{TROX}$ on line 58 for transmission to receive control 35 and transmit control 37.

Transmit/receive bit counter

Referring to FIG. 5, transmit/receive bit counter 34 includes OR-gate 60 receiving signal FLDR on line 61 from transmit control 37 and signal FFIB on line 62 from receive control 35. Signal FLDR on line 61 occurs just prior to commencement of transmission of information from R-register 36 to modem signal transfer unit 30. Signal FFIB occurs just prior to commencement of reception of information in R-register 36 through modem signal transfer unit 30. Output signal CPBC of OR-gate 60 is applied to counter 64 to preset counter 64 to an initial count so that counter 64 overflows and generates signal F016 on line 63 as the last bit of information is transmitted from R-register 36 to modem signal transfer unit 30 during a transmission sequence or as the last shift of information in R-register 36 is performed to properly position the received instruction word in R-register 36 during a reception sequence.

Output signal CPBC of OR-gate 60 is also applied to AND-gate 65 to reset flip-flop HLT to the 0-state. Output signal F016 of counter 64 on line 63 is transmitted to receive control 35 and is also applied to AND-gate 66 connected to the set input terminal of flip-flop HLT to set flip-flop HLT to the 1-state when counter 64 overflows. As known in the art, differentiating circuits (not shown) are employed at the input terminals of flip-flop HLT to provide the set and reset trigger inputs to flip-flop HLT so that flip-flop HLT changes state in response to the falling edge of the corresponding set or reset input signal applied to flip-flop HLT. Output signal $\overline{FHLT}$ of flip-flop HLT on line 67 is applied to AND-gate 68 along with signal TCLK on line 56 from transmit/receive clock 33. Output signal CADV of AND-gate 68 is applied to counter 64 to advance the count in counter 64 in response to each pulse TCLK. Counter 64 is preset by signal CPBC so that the counter overflows to generate signal F016 on line 63 in response to twenty-three TCLK pulses applied to AND-gate 68. Counter 64 thus counts, during reception and transmission sequences, the shifting of an information word into or out of the twenty-three flip-flops of R-register 36. Signal $\overline{FHLT}$ on line 67 is applied to receive control 35 and transmit control 37 while signal FHLT on line 69 is applied to receive control 35.

Receive control

Figure 6:
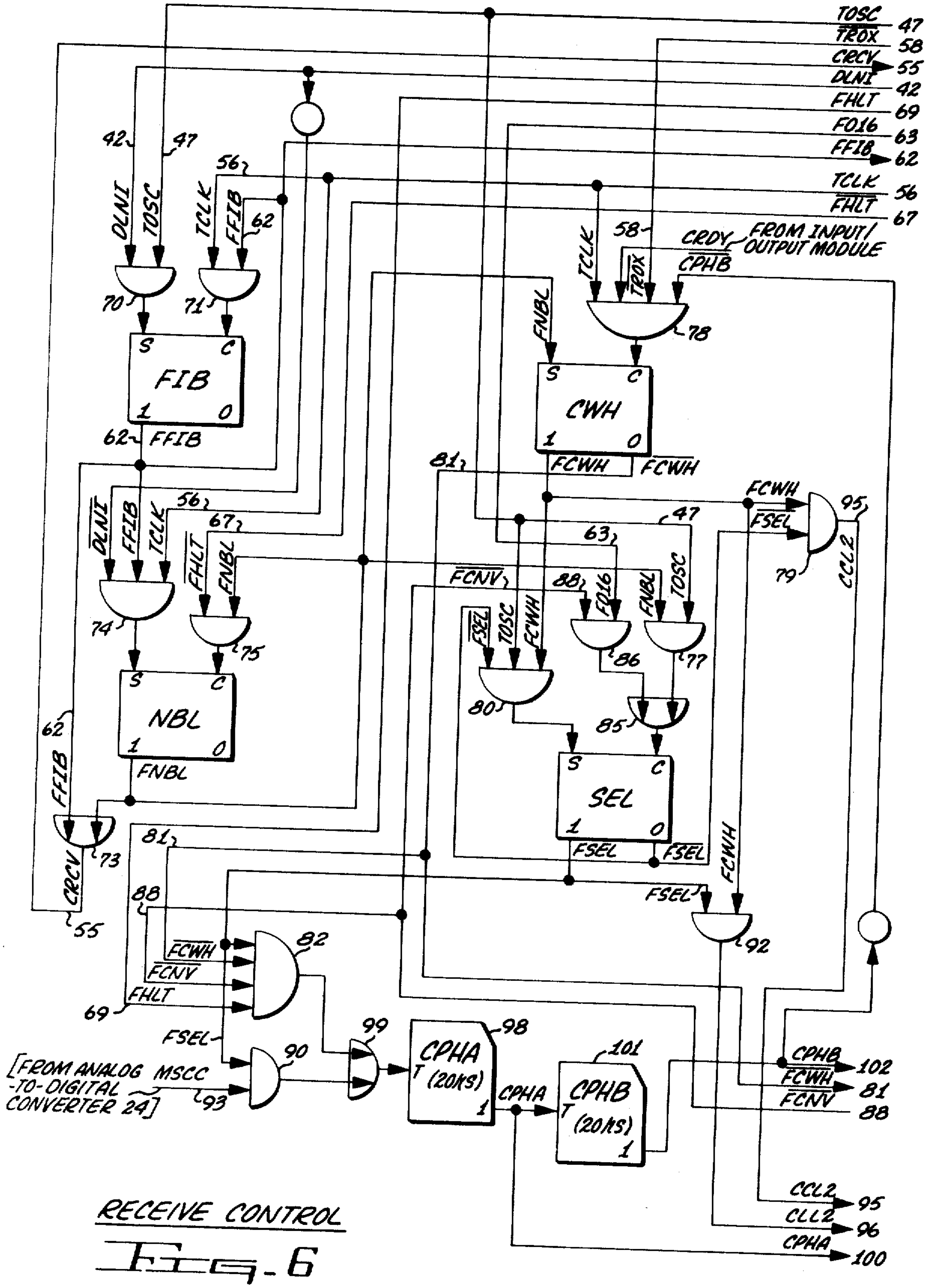
FIG. 6 is a logical diagram illustrating the logical structure of the receive control of the scanner controller of FIG. 2.

The logic details of receive control 35 are illustrated in FIG. 6. Receive control 35 includes flip-flops FIB, NBL, CWH and SEL. As known in the art, differentiating circuits (not shown) are employed at the input terminals of the flip-flops to provide the set and reset trigger inputs so that the flip-flops change state in response to the falling edges of the corresponding set or reset input signals applied to the flip-flop input terminals.

AND-gate 70 connected to the set input terminal of flip-flop FIB receives signal DLNI on line 42 from modem signal transfer unit 30 in addition to basic clock signal TOSC on line 47 from clock generator 31. AND-gate 71 connected to the reset input terminal of flip-flop FIB receives signal TCLK on line 56 from transmit/receive clock 33 and also receives output signal FFIB of flip-flop FIB on line 62. Flip-flop FIB is thus set to the 1-state in response to the falling edge of signal DLNI when signal DLNI changes from mark to space, indicating a start pulse. Flip-flop FIB is reset to the 0-state in response to the falling edge of the next TCLK pulse. Output signal FFIB of flip-flop FIB on line 62 is applied to OR-gate 73, AND-gate 74 and is also transmitted to transmit/receive bit counter 34. OR-gate 73 provides output signal CRCV on line 55 in response to signal FFIB to indicate reception of a start pulse. Signal CRCV is applied to transmit/receive clock 33 to transmit control 37 and to R-register 36.

AND-gate 74 connected to the set input terminal of flip-flop NBL receives, in addition to signal FFIB on line 62, signal $\overline{DLNI}$ on line 42 from modem signal transfer unit 30 and signal TCLK on line 56 from transmit/receive clock 33. AND-gate 75 connected to the reset input terminal of flip-flop NBL receives signal $\overline{FLHT}$ on line 67 from transmit/receive bit counter 34 in addition to output signal FNBL of flip-flop NBL. Output signal FNBL is also applied to OR-gate 73 to generate signal CRCV on line 55, to the set input terminal of flip-flop CWH and to AND-gate 77.

Flip-flop NBL provides noise rejection in the scanner controller so that the scanner controller does not react to transient noise pulses appearing at the output of modem signal transfer unit 30. In operation, the appearance of a signal on line 42 from modem signal transfer unit 30 which appears as a change from mark to space presets the baud rate counter to an initial count so that signal TCLK on line 56 is generated by transmit/receive clock 33 approximately one-half bit time after detection of the apparent start bit. AND-gate 74 is therefore enabled and flip-flop NBL is set to the 1-state, as flip-flop FIB is reset, only if the apparent start bit represented by signal $\overline{DLNI}$ is still present one-half bit time after its initial appearance, as measured by the issuance of signal TCLK. AND-gate 74 thus serves to reject transients up to one-half bit time in duration and functions as a logic filter insuring that flip-flop NBL is not set to the 1-state except in response to a start bit. Flip-flop NBL remains set until flip-flop HLT of transmit/receive bit counter 34 is set, changing signal $\overline{FHLT}$ from a binary 1 to a binary 0.

Flip-flop CWH sets in response to the falling edge of signal FNBL. AND-gate 78 connected to the reset input terminal of flip-flop CWH receives signals TCLK and $\overline{TROX}$ on lines 56 and 58 from transmit/receive clock 33, signal $\overline{CPHB}$ internally generated in receive control 35 and signal CRDY on line 83 from the addressed input/output module indicating that the module has received a command from Scanner Controller 11 and is ready to execute the command. Flip-flop CWH is thus set to the 1-state after an instruction word is stored in R-register 36 during a reception sequence and is reset to the 0-state when the addressed input/output module is ready to respond to the instruction word. Output signal FCWH of flip-flop CWH is applied to AND-gate 79 and to AND-gate 80 connected to the set input terminal of flip-flop SEL. Output signal $\overline{FCWH}$ on line 81 is applied to AND-gate 82 and is also transmitted to transmit control 37.

AND-gate 80 receives signal FCWH from flip-flop CWH, basic clock signal TOSC on line 47 from clock generator 31 and output signal $\overline{FSEL}$ of flip-flop SEL to cause flip-flop SEL to be set to the 1-state shortly after flip-flop CWH is set to the 1-state. OR-gate 85 connected to the reset input terminal of flip-flop SEL receives inputs from AND-gate 77 and AND-gate 86. AND-gate 77 receives output signal FNBL of flip-flop NBL and basic clock signal TOSC on line 47 from clock generator 31. AND-gate 86 receives signal F016 on line 63 from transmit/receive bit counter 34 and signal $\overline{FCNV}$ on line 88 from transmit control 37. The input signals to AND-gate 77 keep flip-flop SEL reset to the 0-state during a reception sequence and the input signals to AND-gate 86 cause flip-flop SEL to be reset to the 0-state upon completion of a transmission sequence. Output signal FSEL of flip-flop SEL is applied to AND-gates 82, 90 and 92. Output signal $\overline{FSEL}$ is applied to AND-gate 79 and to AND-gate 80.

AND-gate 79 is enabled in response to signals FCWH and $\overline{FSEL}$ to generate signal CCL2 on line 95, causing module address and mode buffer 38 to be cleared. AND-gate 92 in enabled in response to signals FCWH and FSEL when both flip-flops CWH and SEL are set to the 1-state to generate signal CLL2 on line 96, causing transfer of module address and mode information from R-register 36 to module address and mode buffer 38.

AND-gate 90 receives signal FSEL from flip-flop SEL and signal MSCC from Analog-to-Digital Converter 24. Signal MSCC on line 93 is generated by Converter 24 when conversion of the analog quantity to digital form is completed. AND-gate 82 receives signals FSEL from flip-flop SEL, $\overline{FCWH}$ on line 81 from flip-flop CWH, $\overline{FCNV}$ on line 88 from transmit control 37 and FHLT on line 69 from transmit/receive bit counter 34. AND-gate 82 is enabled after completion of a reception sequence to trigger one-shot 98 through OR-gate 99. AND-gate 90 is enabled during a transmission sequence if Analog Input Controller 12 has been addressed by a received instruction word and the selected analog signal has been converted to digital form in Analog-to-Digital Converter 24 to similarly trigger one-shot 98. Output pulse CPHA of one-shot 98 on line 100 has a width of twenty microseconds and is applied to one-shot 101 and to module command and timing unit 39. Output pulse CPHB of one-shot 101 on line 102 is also of twenty microseconds duration and is applied to transmit control 37 and to module command and timing unit 39.

Transmit control

Figure 7:
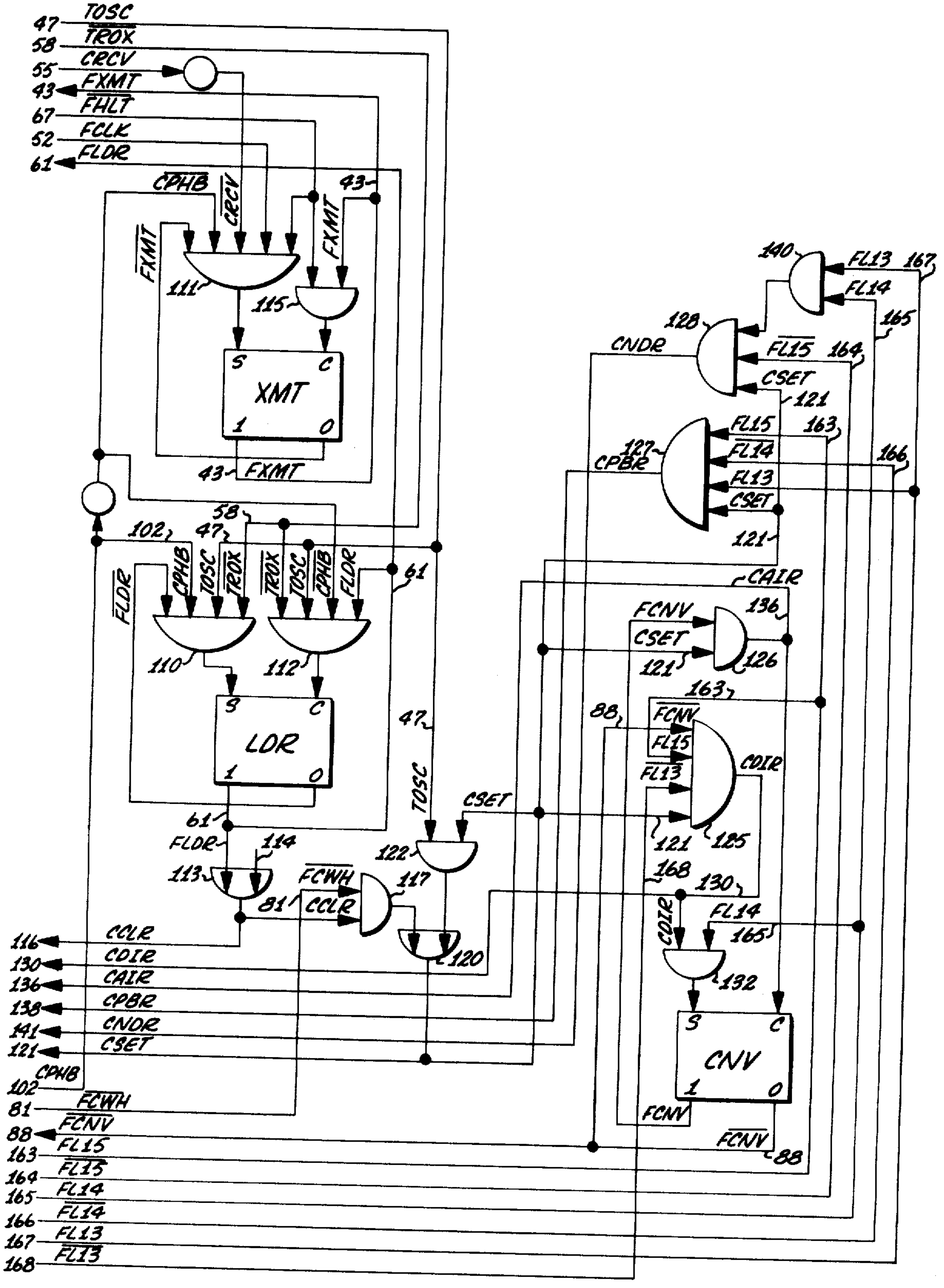
FIG. 7 is a logical diagram illustrating the logical structure of the transmit control of the scanner controller of FIG. 2.

FIG. 7 illustrates the logic details of transmit control 37. Transmit control 37 includes flip-flops XMT, LDR and CNV. As known in the art, differentiating circuits (not shown) are employed at the input terminals of the flip-flops to provide the set and reset trigger inputs so that the flip-flops change state in response to the falling edges of the corresponding set or reset input signals applied to the flip-flop input terminals.

Signal CPHB from line 102 from receive control 35 is applied to inverter 109 and to AND-gate 110. The inverted output of inverter 109 is applied to AND-gates 111 and 112. AND-gate 111, connected to tbe set input terminal of flip-flop XMT, also receives signal $\overline{CRVC}$ on line 55 from receive control 35, signal FCLK, on line 52 from transmit/receive clock 33. Signal $\overline{FHLT}$ on line 67 from transmit/receiver bit counter 34 and signal $\overline{FXMT}$. AND-gate 115, connected to the reset input terminal of flip-flop XMT, receives signals $\overline{FHLT}$ on line 67 from transmit/receive bit counter 34 and signal FXMT. Flip-flop XMT is set to the 1-state by the output signal of AND-gate 111 at the falling edge of the first pulse TCLK which occurs after flip-flop HLT is reset to the 0-state upon completion of a reception sequence, viz when shifting of information from R-register 36 for transmission to Central Processor 10 through modem signal transfer unit 30 of Scanner Controller 11 is initiated. Flip-flop XMT is reset to the 0-state by the output signal of AND-gate 115 when flip-flop HLT is set to the 1-state during a transmission sequence. Output FXMT on line 43 is applied to modem signal transfer unit 30 and to transmit/receive clock 33.

AND-gate 110, connected to the set input terminal of flip-flop LDR receives signal CPHB on line 102 from receive control 35, basic clock signal TOSC on line 47 from clock generator 31, signal $\overline{TROX}$ on line 58 from transmit/receive 33 and signal $\overline{FLDR}$. Flip-flop LDR is set to the 1-state at the falling edge of the first basic clock pulse TOSC which occurs during signal CPHB. AND-gate 112 connected to the reset input terminal of flip-flop LDR receives signal $\overline{TROX}$ on line 58, basic clock signal TOSC on line 47, signal $\overline{CPHB}$ and signal FLDR. Flip-flop LDR is reset to the 0-state by the output signal of AND-gate 112 at the falling edge of the first clock signal TOSC occurring after signal CPHB becomes a binary 0. Output signal FLDR of flip-flop LDR on line 61 is applied to transmit/receive bit counter 34, to AND-gate 112 and to OR-gate 113. OR-gate 113 may also receive an input on line 114 from a test panel, not shown.

Output signal CCLR of OR-gate 115 on line 116 is applied to R-register 36 and to AND-gate 117. Signal CCLR serves to clear R-register 36. AND-gate 117 also receives signal $\overline{FOWH}$ on line 81 from receive control 35. The output signal of AND-gate 117 is applied to OR-gate 120, output signal CSET of OR-gate 120 on line 121 being applied to an input terminal of AND-gate 122. AND-gate 122 also receives basic clock signal TOSC on line 47. The output of AND-gate 122 is also applied to OR-gate 120 to generate signal CSET. Signal CSET thus issues concurrently with signal CCLR but has a duration a fraction of a microsecond longer than signal CCLR due to the operation of AND-gate 122. Signal CSET also serves to gate input/output module status information into R-register 36 and is employed in transmit control 37 to generate other gating signals.

Signal CSET on line 121 is applied to each of AND-gates 125, 126, 127 and 128. AND-gate 125 also receives signals $\overline{FCNV}$ on line 88 from flip-flop CNV and signals FL15 and $\overline{FL13}$ on lines 163 and 168 respectively from module address and mode buffer 38. Signal combination FL15 $\overline{FL13}$ indicates that the module address and mode bits contained in the instruction word received during the reception sequence were either $4_8$ requiring an input from Digital Input Controller 13 or $6_8$ requiring an input from Analog Input Controller 12. Output signal CDIR of AND-gate 125 on line 130 thus issues concurrently with signal CSET immediately after the reception sequence if either Analog Input Controller 12 or Digital Input Controller 13 are addressed. Signal CDIR on line 130 is applied to input gates of R-register 36 to gate digital information from Digital Input Controller 13 into R-register 36. Signal CDIR is also applied to AND-gate 132 along with output signal FL14 on line 165 from module address and mode buffer 38. If signal FL14 is present, the addressed input/output module is Analog Input Controller 12. The output signal of AND-gate 132 causes flip-flop CNV to be set at the falling edge of signal CDIR. Output signal FCNV of flip-flop CNV is applied to AND-gate 126. Output signal $\overline{FCNV}$ on line 88 is applied to receive control 35 and to AND-gate 125.

AND-gate 126 is enabled in response to signals FCNV and CSET to generate signal CAIR on line 136. Signal CAIR is applied to input gates of R-register 36 to gate analog information from Analog-to-Digital Converter 24 into R-register 36. Signal CAIR is also applied to the reset input terminal of flip-flop CNV to reset flip-flop CNV to the 0-state at the falling edge of signal CAIR.

Gates 125, 126 and 132 and flip-flop CNV operate to cause the transfer of both digital and analog information to R-register 36 if Analog Input Controller 12 is identified by the module address and mode bits of a received instruction word. Signal CDIR first issues to gate digital information into Scanner Controller 11 from Digital Input Controller 13. Signal CDIR also sets flip-flop CNV, output signal FCNV of flip-flop CNV preventing flip-flop SEL in receive control 35 from being normally reset to the 0-state upon completion of transfer of the digital information from R-register 36 to Central Processor 10. Output signal FSEL of flip-flop SEL permits signal CPHA and CPHB to again issue, setting flip-flop LDR to permit R-register 36 to be loaded with additional information. Output signal FCNV of flip-flop CNV permits gating signal CAIR to issue to subsequently gate analog information from Analog-to-Digital Converter 24 into R-register 36. Signal CAIR causes flip-flop CNV to be reset to the 0-state, permitting normal termination of the transmission sequence after transmission of the analog information to Central Processor 10.

AND-gate 127 is enabled in repsonse to signal CSET and a bit configuration of $5_8$ in the module address and mode bits of the received instruction word, as represented by output signals FL15, $\overline{FL14}$ and FL13 of module address and mode buffer 38 on lines 163, 166 and 167 respectively, requiring transmission of information from Peripheral Buffer 14 to Central Processor 10. Output signal CPBR of AND-gate 127 on line 138 is applied to input gates of R-resistor 36 to gate information from Peripheral Buffer 14 into R-register 36.

AND-gate 128 receives signal CSET, signal $\overline{FL15}$ on line 164 from module address and mode buffer 38 and the output of AND-gate 140. AND-gate 140 receives signals FL13 on line 167 and FL14 on line 165 from module address and mode buffer 38. AND-gate 128 is thus enabled to provide signal CNDR on line 141 if the module address and mode bits of the received instruction word are $0_8$, $1_8$, $2_8$, $3_8$, or $7_8$, requiring a non-data response. Signal CNDR on line 141 is applied to input gates of R-register 36 to gate information into R-register 36 required during a non-data response to Central Processor 10.

R-register

Figure 8:
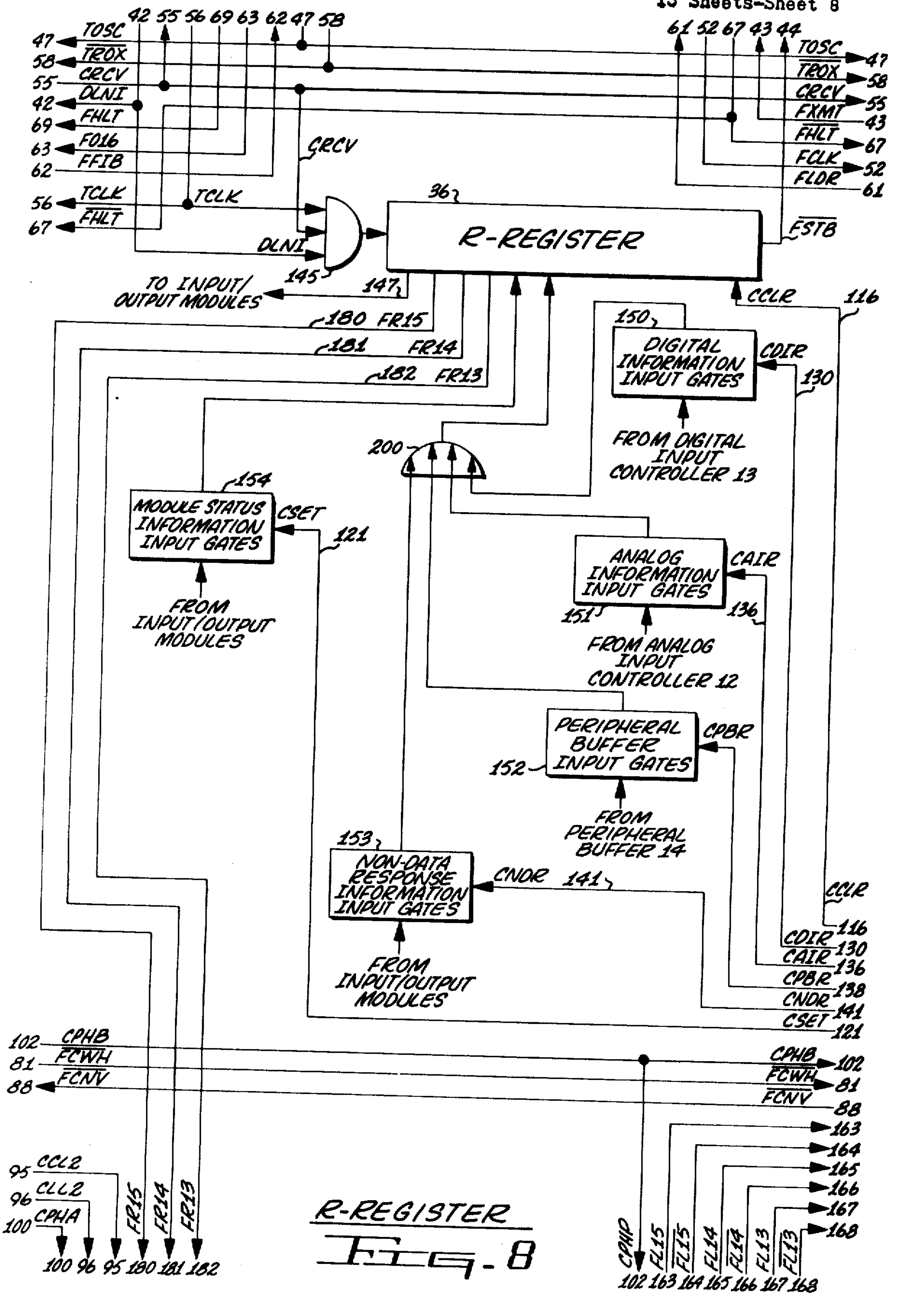
FIG. 8 is a logic diagram illustrating the R-Register and the gating structure providing information to the R-Register of the scanner controller of FIG. 2.

FIG. 8 illusrtates R-register 36 and the gates transferring information into R-register 36. R-register 36 is a 23-bit register comprising flip-flops SB2, SB1, PAR, R18-R00 and STB, as shown in FIGS. 3 and 4. During a reception sequence, AND-gate 145 receives incoming data signal DLNI from modem signal transfer unit 30 on line 42, clock signal TCLK from transmit/receive clock 33 on line 56 and signal CRCV, identifying a reception sequence, from receive control 35 on line 55. The information bits gated through AND-gate 145 are serially shifted in R-register 36 under control of transmit/receive bit counter 34 until the received instruction word is properly positioned in R-register 36. The module address and mode bits in R-register 36, represented by signals FR15, FR14 and FR13, are transmitted to module address and mode buffer 38 on lines 180, 181 and 182. Data and control information is transferred in parallel to the input/output modules on lines 147.

Signal CCLR on line 116 from transmit control 37 clears R-register 36, preparatory to reception of information from the input/output modules. Input gates 150 are enabled by gating signal CDIR on line 130 to transfer information from Digital Input Controller 13 to R-register 36 through OR-gate 200. Input gates 151 are enabled by gating signal CAIR on line 136 to transfer information from Analog Input Controller 12 through OR-gate 200 to R-register 36. Input gates 152 are enabled by gating signal CPBR on line 138 to transfer information to Peripheral Buffer 14 to R-register 36 through OR-gate 200. Input gates 153 are enabled by gating signal CNDR on line 141 to transfer information from the input/output modules to R-register 36 through OR-gate 200 as required during a non-data response to a received instruction word. Input gates 154 are enabled by signal CSET on line 121 to transfer status information from the input/output modules to R-register 36. Gating signals CDIR, CAIR, CPBR, CNDR and CSET are provided by transmit control 37. Information from the input/output modules in R-register 36 is serially shifted from R-register 36 during a transmission sequence and applied to modem signal transfer unit 30.

Module address and mode buffer

Figure 9:
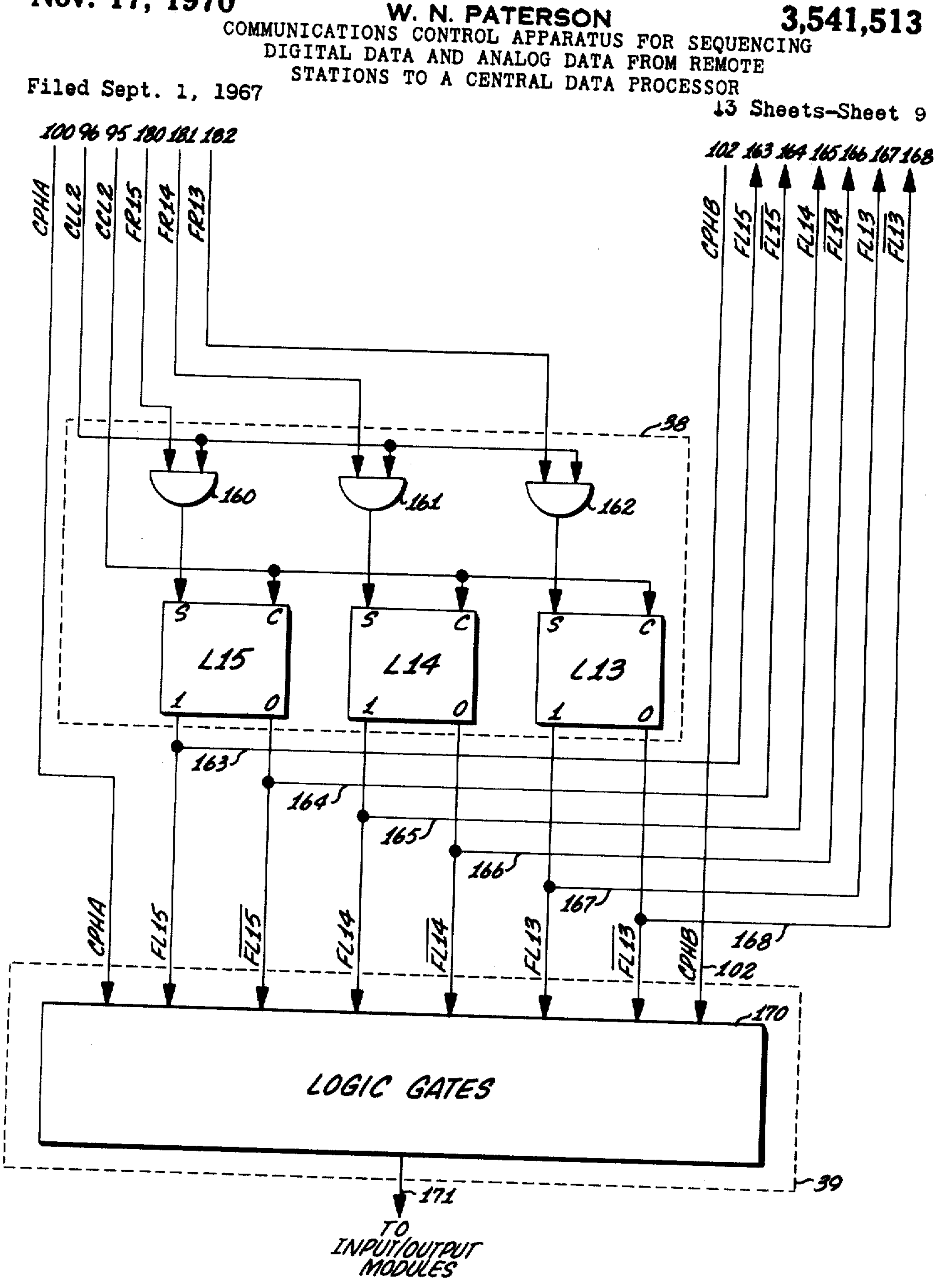
FIG. 9 is a logic diagram illustrating the module address and mode buffer and the module command and timing unit of a scanner controller of FIG. 2.
Figure 11:
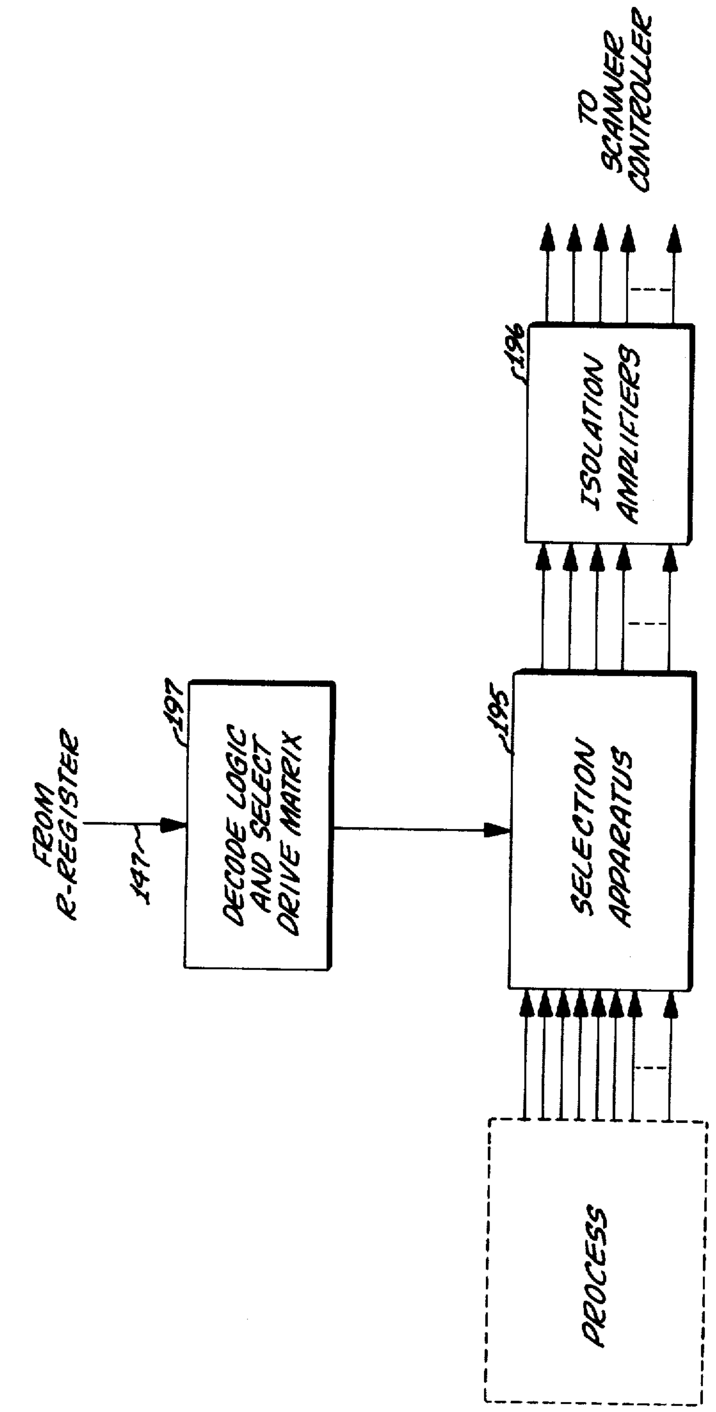
FIG. 11 is a block diagram illustrating the structure of the digital input controller of the system of FIG. 1.

FIG. 9 illustrates the logic structure of module address and mode buffer 38. Referring to FIG. 11, each of flip-flops L15–L13 of module address and mode buffer 38 is reset in response to signal CCL2 on line 95 from receive control 35. Input gate 160 connected to the set input terminal of flip-flop L15 receives output signal FR15 of flip-flop R15 of R-register 36 on line 180 in addition to gating signal CLL2 on line 96 from receive control 35. Input gates 161 and 162 connected to the set input terminals of flip-flops L14 and L13 respectively receive output signals FR14 and FR13 from R-register 36 on lines 181 and 182 respectively in addition to gating signal CLL2 on line 96. In response to signal CLL2, the module address and mode bits of the received instruction word in R-register 36 are transferred to the corresponding flip-flops of module address and mode buffer 38. The output signals of flip-flops L15–L13 on lines 163–168 are applied to module command and timing unit 39 and to transmit control 37.

Module command and timing unit

Referring to FIG. 9, module command and timing unit 39 comprises logic gates 170 which receive the output signals of module address and mode buffer 38 in addition to timing signals CPHA and CPHB on lines 100 and 102 respectively from receive control 35. The output signals of logic gates 170 comprise command and timing information necessary for operation of the input/output modules and are applied to the input/output modules on lines 171.

Analog input controller

Figure 10:
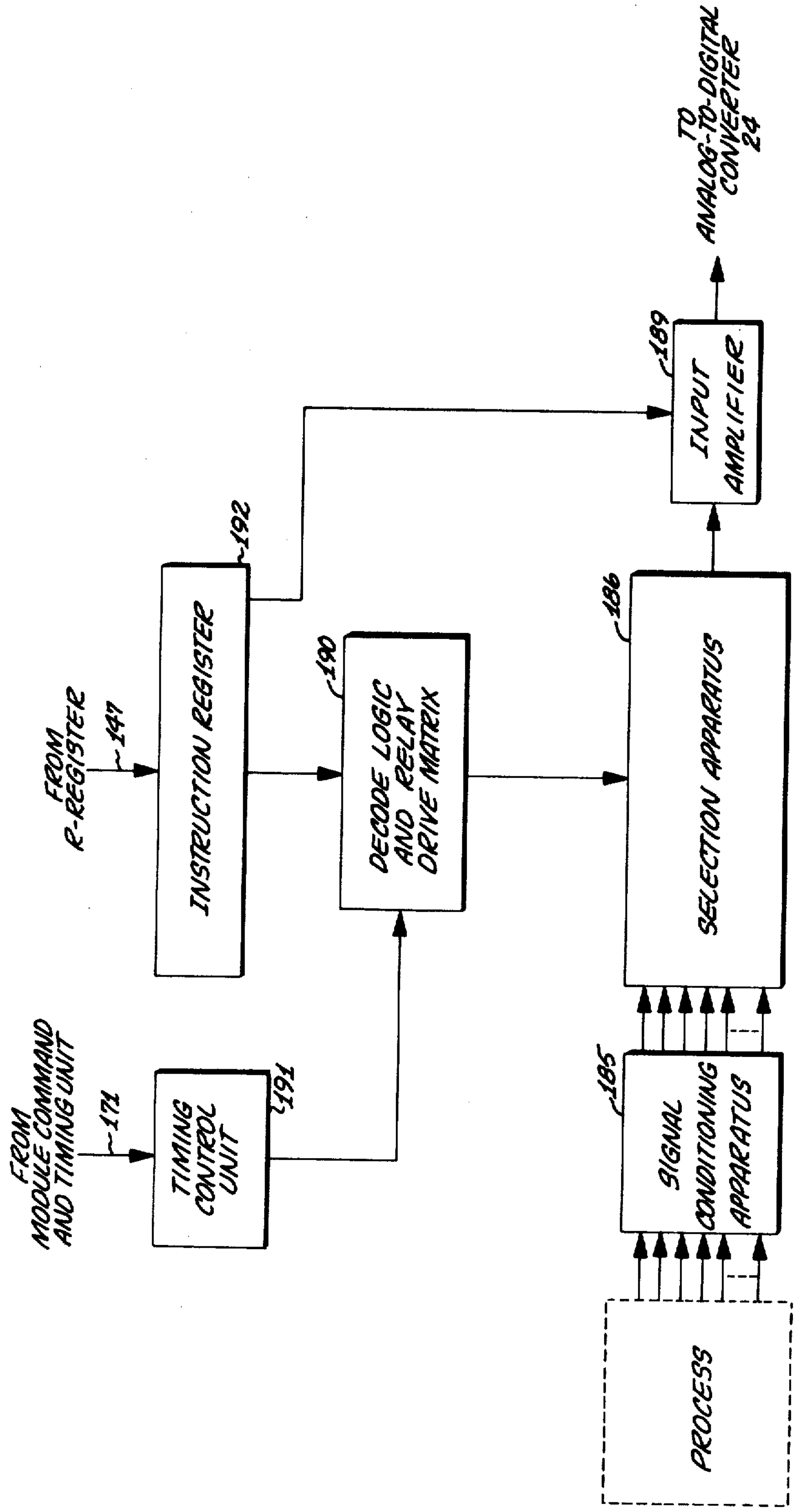
FIG. 10 is a block diagram illustrating the structure of the analog input controller of the system of FIG. 1.

FIG. 10 is a block diagram illustrating the structure of Analog Input Controller 12. Analog signals representing process parameters are applied to signal conditioning apparatus 185 which converts current signals to voltage signals and filters the analog signals. The analog output signals of signal conditioning apparatus 185 are applied to selection apparatus 186, the analog signal transferred through selection apparatus 186 being applied to input amplifier 189. Amplifier 189 serves to amplify the selected analog signal, the output of amplifier 189 being applied to Analog-to-Digital Converter 24. Relay selection and amplification is controlled by decode logic and relay drive matrix 190 which receives inputs from timing control unit 191 and instruction register 192. Instruction register 192 receives from R-register 36 on lines 147 the W, N, M, P and Q address information contained in the received instruction word in addition to gain information. Timing control unit 191 reecives command and timing information from module timing and command unit 39 on lines 171.

Instruction register 192 utilizes the gain information obtained from R-register 36 to control the gain of input amplifier 189. Decode logic and relay drive matrix 190 utilizes the address information from instruction register 192 and the command and timing information from timing control unit 191 to energize selection apparatus 186 so that a selected one of 512 analog signals applied to signal conditioning appartus 185 is applied to input amplifier 189 for application to Analog-to-Digital Converter 24. Decode logic and relay drive matrix 190 includes timing devices for controlling relay operation and sequencing.

Digital input controller

FIG. 11 is a block diagram illustrating the structure of Digital Input Controller 13. A plurality of digital signals representing process information are applied to selection apparatus 195. Selected outputs of apparatus 195 are amplified in isolation amplifiers 196, the outputs of amplifiers 196 being applied to digital input gates 150 connected to R-register 36. Selection apparatus 195 is controlled by decode logic and select drive matrix 197 which receives L1 and L0 address information from the appropriate flip-flops of R-register 36 on lines 147. Decode logic and select drive matrix 197 utilizes the address information to control selection apparatus 195 in selecting one of 64 groups of digital signals for application to amplifiers 196 and transmission through Scanner Controller 11 to Central Processor 10.

SCANNER CONTROLLER—OPERATION

Figure 12:
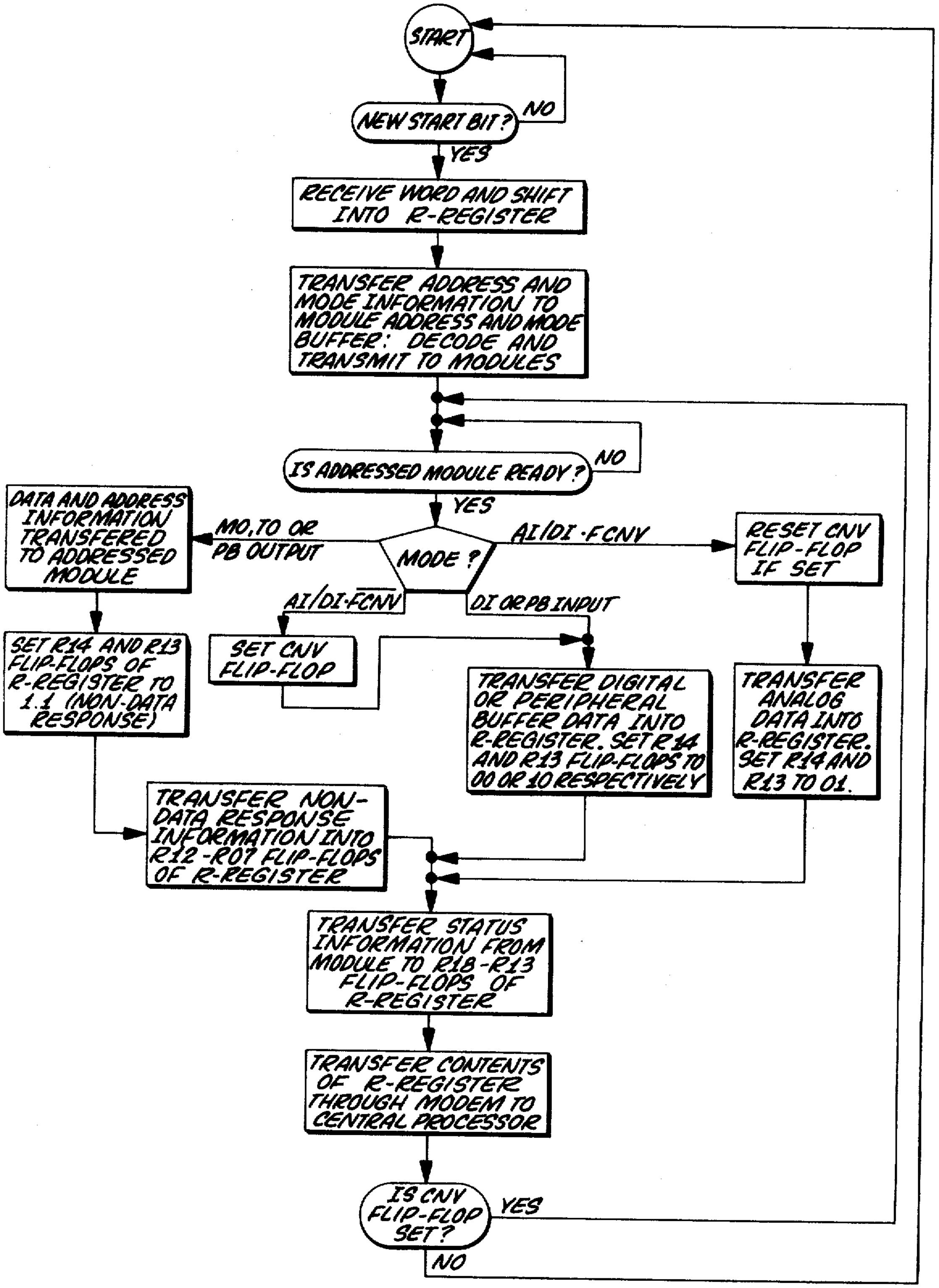
FIG. 12 is a flow diagram illustrating the operation of the scanner controller of the invention.

A flow chart illustrating the operation of Scanner Controller 11 during reception and transmission sequences is illustrated in FIG. 12. Referring to FIG. 12, upon reception of a start bit in modem signal transfer unit 30, the instruction word is serially shifted into R-register 36. The module address and mode bits in flip-flops R15–R13 of R-register 36 are transferred to module address and mode buffer 38 for application to module command and timing unit 39 for transmission to the input/output modules. When the addressed module is ready, indicated by signal CRDY received from the module, the scanner controller enters the mode of operation determined by the module address and mode bits of the received instruction word. If the module address and mode bits are $0_8$, $1_8$, $2_8$, $3_8$ or $7_8$, requiring an output operation involving Peripheral Buffer 14, Multiple Output Controller 15 or Timed Output Controller 16, the data and address information in R-register 36 is transferred to the appropriate input/output module. Flip-flops R14 and R13 of R-register 36 are set to the 1-state to indicate that the transmission sequence will entail a non-data response. Non-data response information, as illustrated in FIG. 4, is transferred from the modules into flip-flops R12–R07 of R-register 36 through the appropriate R-register input gates.

Status information is also transferred from the input/output modules to flip-flops R18–R15 of R-register 36 through the appropriate input gates. The contents of R-register 36 are serially shifted through modem signal transfer unit 30 to Modem 22 for transmission to Central Processor 10. The tranmission sequence terminates and Scanner Controller 11 then waits for another start bit indicating initiation of a new reception sequence.

If the module address and mode bits of the received instruction word are $6_8$, indicating an input operation from Analog Input Controller 12, and if flip-flop CNV is reset to the 0-state, flip-flop CNV is set to indicate the first portion of an analog input transmission sequence. Digital information from Digital Input Controller 13 is gated into R-register 36 and flip-flops R14 and R13 of R-register 36 are set to 00 to indicate a transfer of digital information to Central Processor 10. Status information from the input/output modules is gated into flip-flops

R18–R15 of R-register 36 and the contents of R-register 36 are serially shifted through modem signal transfer unit 30 to Modem 22 for transmission to Central Processor 10. The state of flip-flops CNV is checked and, being set to the 1-state, Scanner Controller 11 next determines if Analog-to-Digital Converter 24 is ready to transmit information to R-register 36. The contents of module address and mode buffer 38 still identify an analog transmission sequence and input signal FCNV indicates that the second portion of the transmission sequence is to occur. Flip-flop CNV is reset to the 0-state and the output of Analog-to-Digital Converter 24 is gated into R-register 36. Flip-flops R14 and R13 of R-register 36 are set to 01 to indicate the transmission of analog information to Central Processor 10. Status information is gated into flip-flops R18–R15 from the input/output modules and the contents of R-register 36 are serially shifted through modem signal transfer unit 30 to Modem 22 for transmission to Central Processor 10. Flip-flop CNV being reset to the 0-state, the transmission sequence terminates and Scanner Controller 11 again waits to receive another start bit to initiate a new reception sequence.

If the module address and mode bits of the received instruction word are $4_8$ or $5_8$, indicating a digital input or a peripheral buffer input respectively, information from Digital Input Controller 13 or Peripheral Buffer 14, as appropriate, is gated into R-register 36 and flip-flops R14 and R13 are set to 00 or 10 respectively to indicate the transfer of digital information or the transfer of information from Peripheral Buffer 14 to Central Processor 10. Status information from the input/output modules is gated into flip-flops R18–R15 of R-register 36 and the contents of R-register 36 are serially shifted through modem signal transfer unit 30 to Modem 22 for transmission to Central Processor 10. The transmission sequence terminates and Scanner Controller 11 is prepared to receive another start bit initiating a new reception sequence.

Figure 13:
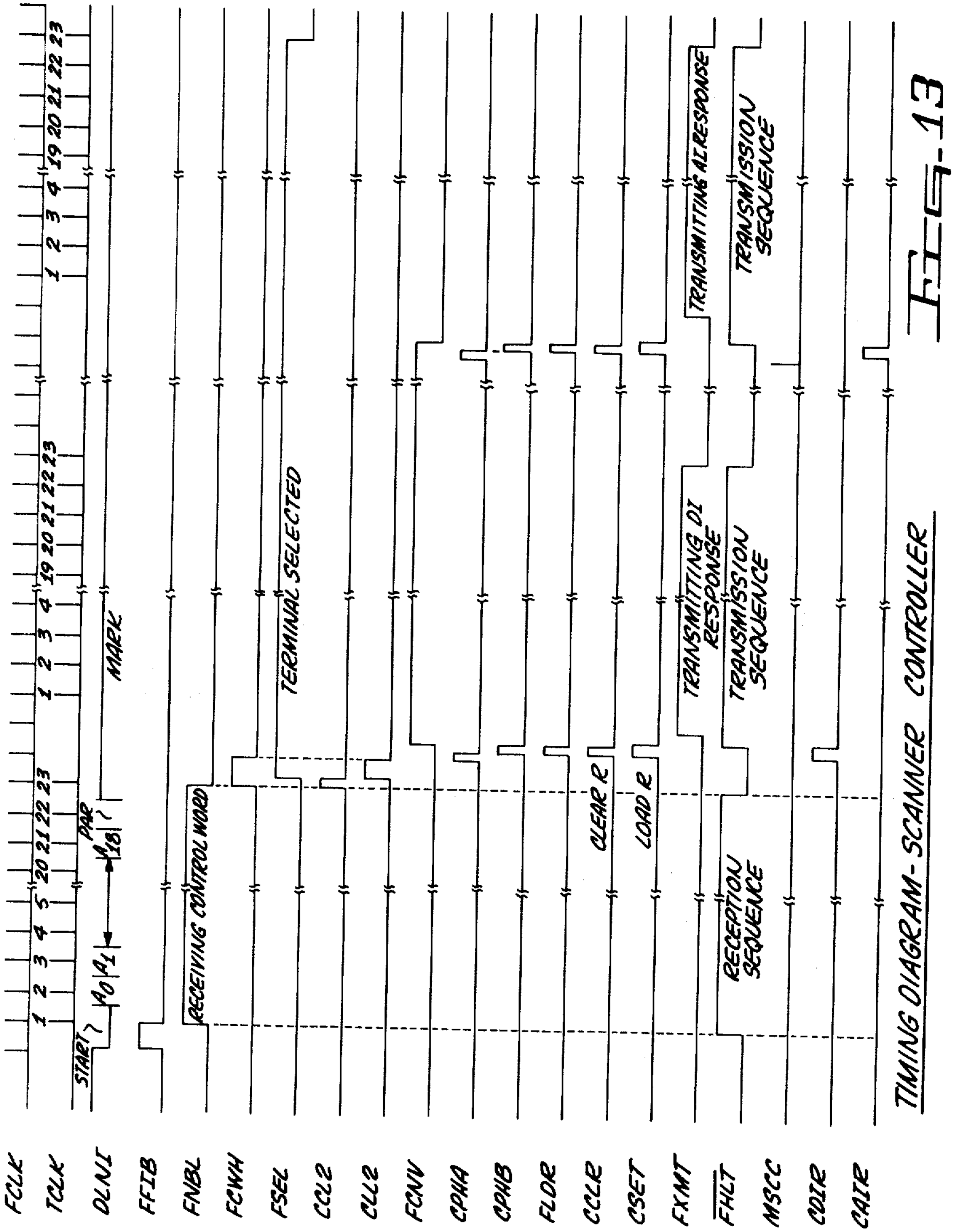
FIG. 13 is a timing diagram illustrating the details of operation of the scanner controller of the invention.

FIG. 13 is a timing diagram illustrating the operation of Scanner Controller 11 during reception and transmission sequences when the module address and mode bits of a received instruction word are $6_8$, requiring the transmission of analog information from Analog Input Controller 12 to Central Processor 10. Referring to FIG. 13, a change of the input signal from Modem 22 applied to modem signal transfer unit 30 from mark to space causes signal DLNI to change from a binary 1 to a binary 0, causing flip-flop FIB to be set to the 1-state. The first clock pulse TCLK issues one-half bit time later and, if signal DLNI is still a binary 0, flip-flop NBL is set to the 1-state, flip-flop FIB being reset to the 0-state. Flip-flop HLT is reset to the 0-state at the falling edge of signal FFIB to enable the count in transmit/receive bit counter 34 to be incremented from its preset state in response to each clock pulse TCLK. As each clock pulse TCLK issues, successive bits of the instruction word transmitted from Central Processor 10 following the start bit are shifted into R-register 36. In response to the twenty-third clock pulse TCLK, flip-flop HLT is set to the 1-state, indicating that the received instruction word is correctly positioned in R-register 36.

Flip-flop NBL is reset to the 0-state at the falling edge of signal $\overline{FHLT}$, inhibiting further generation of TCLK clock pulses in transmit/receive clock 33. Flip-flop CWH is set to the 1-state in response to the falling edge of signal FNBL, causing signal CCL2 to issue to clear module address and mode buffer 38. Flip-flop SEL is then set to the 1-state and signal CLL2 issues to gate the module and address mode bits from R-register 36 into module address and mode buffer 38. Flip-flop CWH is reset to the 0-state upon receipt of signal CRDY from Digital Input Controller 13 indicating that Digital Input Controller 13 is ready to transmit digital information to R-register 36. Upon clearing of flip-flop CWH, timing signal CPHA and CPHB issue and the address information in flip-flops R08–R03 of R-register 36 is transferred in parallel to Digital Input Controller 13. Flip-flop LDR is set to the 1-state upon issuance of timing signal CPHB causing signal CCLR to issue, clearing R-register 36. Signal CSET also issues to generate signal CDIR, signals CSET and CDIR having pulse widths slightly greater than that of signal CCLR to cause digital information to be gated in parallel from Digital Input Controller 13 into R-register 36. Signal CDIR causes flip-flop CNV to be set to the 1-state. Flip-flop LDR is reset to the 0-state and, at the trailing edge of the signal FLDR, flip-flop HLT is reset to the 0-state, enabling flip-flop XMT to be set at the falling edge of the next FCLK signal. Signal FXMT enables generation of clock signals TCLK by transmit/receive clock 33, causing the contents of R-register 36 to be serially shifted through one bit position for each clock pulse TCLK and gating the successive bits shifted out of R-register 36 through modem signal transfer unit 30 to Modem 22 for transmission to Central Processor 10. Transmit/receive bit counter 34 counts 23 TCLK clock signals before resetting flip-flop HLT to terminate the transmission of digital information from Digital Input Controller 13 through Scanner 11 to Central Processor 10. Flip-flop XMT is reset to the 0-state at the falling edge of signal $\overline{FHLT}$.

Upon receipt of signal MSCC from Analog-to-Digital Converter 24 indicating that the converted analog information is available at the output of converter 24, timing signal CPHA and CPHB issue causing flip-flop LDR to be set to the 1-state and signal CCLR, CSET and CAIR to issue clearing R-register 36 and gating the output of Analog-to-Digital Converter 24 and input/output module status information in parallel into R-register 36. Flip-flop CNV is reset to the 0-state in response to signal CAIR. Flip-flop LDR is reset to the 0-state, the falling edge of signal FLDR causing flip-flop HLT to be reset to the 0-state. The next FCLK signal from transmit-receive clock 33 causes flip-flop XMT to be set to the 1-state, enabling generation of clock signals TCLK and transmission of the analog and status information in R-register 36 through modem signal transfer unit 30 and Modem 22 to Central Processor 10. Upon completion of transmission of the information in R-register 36, flip-flop XMT is reset to the 0-state and flip-flop HLT is set to the 1-state to terminate the transmission sequence.

Accordingly, there has been described herein digital computer apparatus embodying the instant invention. While the principles of the invention have now been made clear in an illustrative embodiment, there will be immediately obvious to those skilled in the art many modifications in structure, arrangement, proportions, elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

I claim:

1. In a data communications system, the combination comprising: central data utilization means, a plurality of data source means for providing data for transmission to said central data utilization means, each data source means providing data in response to a corresponding request from said central data utilization means, and communication control means reponsive to each request provided by said central data utilization means for transmitting data from the corresponding data source means to said central data utilization means, said communication control means including means responsive to a request for data from a predetermined one of said data source means for transmitting to said utilization means data from the predetermined one of said data source means and for also transmitting to said utilization means data from another predetermined one of said data source means.

2. In a data communications system, the combination comprising: central data utilization means, a plurality of data source means for providing data for transmission to said central data utilization means, each data source means providing data in response to a corresponding request from said central data utilization means, and communication control means responsive to each request provided by said central data utilization means for transmitting data from the corresponding data source means to said central data utilization means, said communication control means including means responsive to a request for data from a first predetermined one of said data source means for transmitting to said utilization means data from a second predetermined one of said data source means prior to transmitting to said utilization means the data from the first predetermined one of said data source means.

3. In a data communications system, the combination comprising: central data utilization means, a plurality of data source means for providing data for transmission to said central data utilization means, each data source means providing data in response to a corresponding request from said central data utilization means, a predetermined one of said data source means requiring a predetermined time period after receipt of a request before providing data for transmission to said central data utilization means, and communication control means responsive to each request provided by said central data utilization means for transmitting data from the corresponding data source means to said central data utilization means, said communication control means including means responsive to a request for data from the predetermined one of said data source means for transmitting to said utilization means data from another predetermined one of said data source means during the predetermined time period.

4. In a data communication system, the combination comprising: central data utilization means, first and second data source means for providing data for transmission to said central data utilization means, each data source means providing data in response to a corresponding request from said central data utilization means, and communication control means for transmitting data from said first and second data source means to said central data utilization means, said communication control means including first means responsive to a request from said central data utilization means for data from said first data source means for transmitting data from said first data source means to said utilization means, said communication control means including second means responsive to a request from said central data utilization means for data from said second data source means for transmitting to said utilization means data from both said first and said second data source means.

5. In a computer system, the combination comprising: a central processor, a plurality of input/output modules including digital input means and analog input means, communication control means for controlling the transfer of information between said central processor and said plurality of input/output modules, means included in said central processor for transmitting to said communication control means requests for informaion from selected ones of said input/output modules, means included in said communication control means responsive to a request from said central processor for information from said digital input means for transferring information from said digital input means to said central processor, and means included in said communication control means responsive to a request from said central processor for information from said analog input means for transmitting to said central processor information from both said digital input means and from said analog input means.

6. In a computer system, the combination comprising: a central processor, a plurality of input/output modules including digital input means and analog input means, communication control means for controlling the transfer of information between said central processor and said plurality of input/output modules, means included in said central processor for transmitting to said communication control means requests for information from said input/output modules, means included in said communication control means responsive to a request from said central processor for information from said digital input means for transferring information from said digital input means to said central processor, and means included in said communication control means responsive to a request from said central processor for information from said analog input means for transmitting information from said analog input means to said central processor a predetermined time period after receipt of the request from said central processor, and means included in said communication control means responsive to a request from said central processor for information from said analog input means for transmitting to said central processor information from said digital input means during the predetermined time period prior to transmission of information from said analog input means to said central processor.

7. In a computer system, the combination comprising: a central processor, a plurality of input/output modules including digital input means and including analog input means comprising analog information selection means and analog-to-digital converter means, communication control means for controlling the transfer of information between said central processor and said plurality of input/output modules, means included in said central processor for transmitting to said communication control means requests for information from selected ones of said input/output modules, means included in said communication control means responsive to a request from said central processor for information from said digital input means for transferring information from said digital input means to said central processor, and means included in said communication control means responsive to a request from said central processor for information from said analog input means for initiating operation of said analog information selection means and said analog-to-digital converter means concurrently with the transfer of information from said digital input means to said central processor and for subsequently transferring the output of said analog-to-digital converter means to said central processor.

8. In a computer system, the combination comprising: a central processor, a plurality of input/output modules including digital input means and analog input means, communication control means for controlling the transfer of information between said central processor and said plurality of input/output modules, said communication control means including a bistable control element normally in a first state, means included in said central processor for transmitting to said communication control means requests for information from said input/output modules, means included in said communication control means responsive to a request from said central processor for information from said digital input means for transferring information from said digital input means to said central processor, means included in said communication control means responsive to a request from said central processor for information from said analog input means for transmitting to said central processor information from said digital input means and for concurrently causing said bistable control element to assume a second state, and means included in said communication control means responsive to the second state of said bistable control element and to completion of transfer of information from said digital input means to said central processor for transmitting to said central processor information from said analog input means.

9. In a process monitoring and control system, the combination comprising: processor means for processing information, means for sensing a plurality of analog and digital parameters of the process and providing a corresponding plurality of analog and digital electrical signals representing the analog and digital parameters, digital input means responsive to an address item for selecting and making available for transmission to said processor means the digital signal representing the digital parameter corresponding to the address item, analog input means comprising analog controller means responsive to an address item for selecting the analog signal representing the analog parameter corresponding to the address item, said analog input means also including analog-to-digital converter means for converting the analog signal selected by said analog controller means to a digital signal and making the converted digital signal available for transmission to said processor means, a predetermined time period elapsing between receipt of an address item by said analog input means and generation of a digital signal by said analog-to-digital converter means corresponding to the selected analog signal, communication control means for controlling the transfer of information between said processor means and said analog and digital input means, means included in said processor means for transmitting to said communication control means requests for information, such requests identifying the input means from which information is required and including an address item identifying a selected process parameter, means included in said communication control means responsive to a request from said processor means for information from said digital input means for transmitting the address item of the request to said digital input means and for transmitting the corresponding digital signal provided by said digital input means to said processor means, and means included in said communication control means responsive to a request from said processor means for information from said analog input means for transmitting the address item of the request to said digital input means and to said analog input means to initiate operation of said analog controller means and said analog-to-digital converter means and for transmitting the corresponding digital signal provided by said digital input means to said processor means during the predetermined time period and for subsequently transferring the signal provided by said analog-to-digital converter means to said processor means.

References Cited

UNITED STATES PATENTS

| | | | |
|---|---|---|---|
| 2,946,044 | 7/1960 | Bolgiano et al. | |
| 3,349,374 | 10/1967 | Gabrielson et al. ---- | 340—163 |

DONALD J. YUSKO, Primary Examiner

U.S. Cl. X.R.

340—172.5

UNITED STATES PATENT OFFICE
CERTIFICATE OF CORRECTION

Patent No. 3,541,513 Dated November 17, 1970

Inventor(s) Wallace N. Patterson

It is certified that error appears in the above-identified patent and that said Letters Patent are hereby corrected as shown below:

In the heading to the drawing, Sheets 1-13, "W.N.PATERSON", each occurrence, should read -- W. N. PATTERSON --. Column 1, line 53, "processes" should read -- process --. Column 3, lines 30 and 31, "logical" should read -- logic --; line 33, "logical" should read -- logic --. Column 5, line 18, "operation" should read -- operations --; line 55, "informtaion" should read -- information --. Column 12, line 1, "tbe" should read -- the --; line 42, "FOWH" should read -- FCWH --. Column 14, line 75, "reecives" should read -- receives --. Column 18, line 60, "informaion" should read -- information --.

Signed and sealed thjs 17th day of August 1971.

(SEAL)
Attest:

EDWARD M.FLETCHER,JR.
Attesting Officer

WILLIAM E. SCHUYLER, JR.
Commissioner of Patents